United States Patent
Sato et al.

(10) Patent No.: US 7,514,377 B2
(45) Date of Patent: Apr. 7, 2009

(54) PLASMA GENERATOR, OZONE GENERATOR, SUBSTRATE PROCESSING APPARATUS AND MANUFACTURING METHOD OF SEMICONDUCTOR DEVICE

(75) Inventors: Noriyoshi Sato, 4-17-113, Kadan, Aoba-ku, Sendai-shi, Miyagi 980-0815 (JP); Takeshi Taniguchi, Tokyo (JP); Hiroshi Mase, 5-3 Takasuzu-cho 5-chome, Hitachi-shi, Ibaraki 317-0066 (JP); Shuitsu Fujii, Hiroshima (JP); Tamiya Fujiwara, 16-2, Nishi-Aoyama 2-chome, Morioka-shi, Iwate 020-0132 (JP)

(73) Assignees: Hitachi Kokusai Electric Inc., Tokyo (JP); Adtec Plasma Technology Co., Ltd., Fukuyama-shi (JP); Noriyoshi Sato, Sendai-shi (JP); Hiroshi Mase, Hitachi-shi (JP); Tamiya Fujiwara, Morioka (JP)

( * ) Notice: Subject to any disclaimer, the term of this patent is extended or adjusted under 35 U.S.C. 154(b) by 528 days.

(21) Appl. No.: 10/539,569

(22) PCT Filed: Dec. 26, 2003

(86) PCT No.: PCT/JP03/16887
§ 371 (c)(1),
(2), (4) Date: Aug. 18, 2005

(87) PCT Pub. No.: WO2004/061929
PCT Pub. Date: Jul. 22, 2004

(65) Prior Publication Data
US 2006/0189168 A1    Aug. 24, 2006

(30) Foreign Application Priority Data
Dec. 27, 2002    (JP)    ............................. 2002-379963

(51) Int. Cl.
*H01L 21/00*    (2006.01)

(52) U.S. Cl. ........................ 438/798; 438/788; 438/792; 118/723 R; 118/723 E

(58) Field of Classification Search ............ 118/723 R, 118/723 E; 438/798; 257/E21.327, E21.471; 429/3; 422/22; 315/111.2
See application file for complete search history.

(56) References Cited

U.S. PATENT DOCUMENTS
5,522,343 A * 6/1996 Kodama et al. ....... 118/723 MP
(Continued)

FOREIGN PATENT DOCUMENTS
| CA | 2516499 | * | 2/2007 |
| JP | A 7-118857 | | 5/1995 |
| JP | A 8-321397 | | 12/1996 |
| JP | A 9-241007 | | 9/1997 |
| JP | A 2003-209212 | | 7/2003 |

*Primary Examiner*—Caridad M Everhart
(74) *Attorney, Agent, or Firm*—Oliff & Berridge, PLC

(57) ABSTRACT

To provide a generator capable of generating plasma and ozone with high efficiency and easy to handle, with a simple structure. An electrode part 10 is formed of electrodes 11 and 12 without dielectric material interposed therebetween. An arc-extinguishing capacitor 13 as a charge storage part for storing charge is connected in series to the electrode part 10. An AC power source 15 generating plasma by causing self-arc-extinguishing discharge between the electrodes 11 and 12 by applying AC voltage to charge and discharge the arc-extinguishing capacitor 13, is connected to both ends of a circuit in which the electrode part 10 and the arc-extinguishing capacitor 13 are connected in series. The arc-extinguishing capacitor 13 and one electrode 12 of the electrode part 10 connected thereto are unitized, for making the electrode part multi-polarized. A unit is constituted of a floating electrode serving as both of the one electrode 12 of the electrode part 10 and one electrode of the arc-extinguishing capacitor 13, an insulating material provided around the floating electrode and a grounding electrode provided around the insulating material.

21 Claims, 18 Drawing Sheets

U.S. PATENT DOCUMENTS

| | | | |
|---|---|---|---|
| 6,855,902 B2 * | 2/2005 | Lee et al. | 218/56 |
| 2003/0010453 A1 * | 1/2003 | Tanaka et al. | 156/345.38 |
| 2003/0070913 A1 * | 4/2003 | Miller et al. | 204/192.1 |
| 2003/0106788 A1 * | 6/2003 | Babko-Malyi | 204/164 |

* cited by examiner (a)

(b)

(a)

(b)

$\tau \simeq CR$ (c)

PLASMA GENERATOR, OZONE GENERATOR, SUBSTRATE PROCESSING APPARATUS AND MANUFACTURING METHOD OF SEMICONDUCTOR DEVICE

TECHNICAL FIELD

The present invention relates to a plasma generator, and an ozone generator and a substrate processing apparatus, and particularly to an apparatus appropriate for generating plasma and ozone by producing a non-steady discharge in an atmospheric pressure.

BACKGROUND ART

A substrate processing apparatus functions to perform processing such as forming and improving a film on a substrate such as a semiconductor substrate or a glass substrate. Ozone is frequently used for the processing such as forming and improving the film. As a most generally used system of generating the ozone, a system using a silent discharge is given as an example.

In the discharge under the atmospheric pressure, usually non-steady discharge (non-arc discharge and non-thermal plasma) is used. The non-steady discharge is used for the reason that there is a fear that through a glow discharge and an arc discharge, a discharge breakdown (ignition) in an atmospheric pressure develops into a thermal breakdown of an apparatus, to make a steady discharge difficult to be used. The silent discharge is a discharge phenomenon observed under atmospheric pressure, in applying a voltage between electrodes where dielectric material is inserted, and the silent discharge becomes a non-steady discharge by the insertion of the dielectric material. Ozone is generated by utilizing the aforementioned discharge. In an ozone generator utilizing the silent discharge, specifically, as shown in FIG. 21, a dielectric material 2 is provided in one (FIG. 21A) or both (FIG. 21B) of a pair of parallel plate electrodes 1 and 1, and by impressing AC high voltage between the electrodes 1 and 1, a plasma discharge is intermittently caused between the electrodes 1 and 1 in the atmospheric pressure. Then, by passing oxygen $O_2$ or dry air in the discharge atmosphere, ozone $O_3$ is generated by utilizing a high energy electron of plasma, and a mixed gas ($O_2+O_3$) is obtained.

Also, in order to generate ozone, a creeping discharge which is one type of the silent discharge is sometimes used. As shown in FIG. 22, the creeping discharge is provided, with the dielectric material 3 put between a dielectric electrode 4 becoming a planar electrode at one side and a discharge electrode 5 becoming a line electrode at the other side. Then, AC high voltage is applied between the both electrodes 4 and 5 by an AC high voltage power source 6, so as to discharge between the discharge electrode 5 and the dielectric material 3. Then, the ozone $O_3$ can be generated by feeding oxygen $O_3$ or dry air in the discharge atmosphere 7.

The aforementioned silent discharge system has a simple structure such that a high voltage AC power source of 20 to 10000 Hz may be used as a power source, and it is necessary only to insert the dielectric material between the electrodes at a discharge part, and embed the electrodes in the dielectric material, and therefore the silent discharge system is exclusively utilized in the ozone generator.

As a conventional technique related to such a silent discharge, for example, the technique recited in the patent document 1 is known. In this technique, granules are formed by covering entire surface of a conductor with an insulating material, and inter-electrodes of electrode pairs is packed with such granules, so that the conductor in the granules forms a small electrode, and the insulating material constitutes a dielectric barrier. Dielectric barrier discharge changes the gas into plasma in a gap between granules. Since each gap between granules is small, even the gas with large discharge starting voltage such as oxygen and nitrogen is capable of generating a uniform glow discharge with an extremely small application power, and plasma and ozone are thereby generated.

Patent document 1: Japanese Patent Laid-open No. 8-321397

DISCLOSURE OF THE INVENTION

However, in the aforementioned ozone generator utilizing the silent discharge disclosed in the patent document 1, it is necessary that the entire surface of the conductor is covered with the insulating material, and inter-electrodes of electrode pairs is packed with the dielectric material, resulting in a complicated structure. In addition, in the dielectric barrier discharge, a discharge current (plasma density) is limited by a small electrostatic capacity of the dielectric material. Therefore, although stable discharge can be induced by applying small voltage, a discharge energy density can not be increased. Accordingly, it is impossible to neither generate plasma with high efficiency, nor generate ozone with high efficiency. Moreover, as described above, inter-electrodes are packed with dielectric material covered with conductor, and therefore handling is not easy.

Note that instead of the silent discharge, a short pulse discharge and an RF discharge systems can be adopted. However, in the short pulse discharge, a high voltage short pulse generator of 10 to 1000 puls/s is required, thereby increasing the cost of the power source, and in addition, a sophisticated pulse compression technology is required. Also, the RF discharge is a high frequency type of the silent discharge, in which a high frequency power supply (13.56 MHz) is required, and a capacity to limit a discharge current is shared by the discharge electrode (referred to as an electrode part hereafter), and therefore a plasma source having various shapes can not be formed, with constrains of the shape of the discharge electrode. In addition, a problem common in the short pulse discharge and the RF discharge is that an apparatus is expanded and the plasma source is difficult to be enlarged.

An object of the present invention is to provide a plasma generator and a substrate processing apparatus capable of generating plasma with high efficiency while having a simple structure, by solving the aforementioned problem of the conventional technique by separating the capacity for liming discharge current from the discharge electrode. Also, the object of the present invention is to provide an ozone generator capable of generating ozone with high efficiency and a substrate processing apparatus. Further, the object of the present invention is to provide a plasma generator, an ozone generator, and a substrate processing apparatus which are easy to handle.

The present invention takes several aspects as follows.

In a first aspect, a plasma generator is provided, an electrode part constituted of plural electrodes;

a charge storage part connected with the electrode part in series for storing charge, and an AC power source for applying AC voltage to a serial connection circuit formed of the electrode part and the charge storage part, wherein by applying the AC voltage to the serial connection circuit formed of the electrode part and the charge storage part by the AC power source, discharge is intermittently caused in each inter-electrodes of the plural electrodes of the electrode part, and plasma is thereby generated.

When the AC voltage applied to the electrode part exceeds the discharge starting voltage, inter-electrodes is virtually short-circuited, and the electrode part starts discharging electric charges to generate plasma. However, since the charge storage part is connected with the electrode part in series, the discharge is effected as long as the charge is stored in the charge storage part, and stops when the storage of charge is completed. Thus, even when the dielectric material is not inserted between the electrodes, the discharge current is limited by the charge storage part, and intermittent discharge is thereby caused.

The inter-electrodes is short-circuited, and a large current discharge is thereby caused, and therefore the discharge energy density becomes larger compared with that of the silent discharge. This contributes to forming plasma with high efficiency even in the atmospheric pressure.

In addition, the discharge caused between plural electrodes of the electrode part becomes a self arc-extinguishing discharge, resulting in being intermittent, and extinguished before becoming an arc discharge. This contributes to reducing damage to the electrode part.

In addition, since the discharge current is limited by the charge storage part connected to the electrode part in series, the constraints of the electrode shape of the electrode part is eliminated, although this is not the case when the charge storage part is not independently provided and the discharge current is limited by the electrode part.

Note that as the plural electrodes constituting the electrode part where heat generation occurs by discharge, a metal electrode excellent in heat releasing property is preferable. Also, at the charge storage part, nothing is required but to store the charge and discharge the charge thus stored, and therefore the charge storage part can be constituted by a simple capacitor. In addition, the power source can be constituted by an inexpensive AC power source.

In a second aspect, an ozone generator is provided, comprising:

an electrode part constituted of plural electrodes;

a charge storage part connected with the electrode part in series, for storing charge; and an AC power source for applying AC voltage to a serial connection circuit formed of the electrode part and the charge storage part, wherein by applying the AC voltage to the serial connection circuit formed of the electrode part and the charge storage part by the AC power source, discharge is caused intermittently in each inter-electrodes of the plural electrodes of the electrode part, and ozone is generated by supplying gas containing oxygen atom in the discharge atmosphere.

In the second aspect, ozone is generated by using plasma generated in the first aspect, and the ozone can be generated with high efficiency.

In a third aspect, a plasma generator is provided, comprising:

an electrode unit constituted of a first electrode, an insulating material or a dielectric material provided around the first electrode, and a second electrode provided around the insulating material or the dielectric material;

a third electrode facing the first electrode; and a power source for applying voltage between the second electrode and the third electrode, wherein by such a power source, the voltage is applied between the second electrode and the third electrode, thereby causing discharge between the first electrode and the third electrode, and plasma is thereby generated. Preferably, the AC voltage is applied between the second electrode and the third electrode.

By providing the insulating material or the dielectric material around the first electrode, and providing the second electrode therearound, the first electrode of the electrode part which makes pair with the third electrode is unitized. This contributes to easy handling of the electrode part and also making the apparatus compact.

In addition, by applying the voltage between the second electrode and the third electrode, when the voltage generated between the first electrode and the third electrode exceeds the discharge starting voltage, inter-electrodes of the first electrode and the third electrode is short-circuited, to allow a large current discharge to be caused. This contributes to forming plasma with high efficiency.

In a fourth aspect, the plasma generator according to the third aspect is provided, wherein a charge storage part for storing charge is formed by the first electrode and the second electrode, with the insulating material or the dielectric material interposed between the first electrode and the second electrode. A unit structure can be thus simplified.

In a fifth aspect, the plasma generator according to the third aspect is provided, wherein by applying AC voltage between the second electrode and the third electrode, a pulse discharge is generated between the first electrode and the third electrode, and plasma is thereby intermittently generated. By generating the pulse discharge, damage to the electrode part can be further reduced in generating plasma.

In a sixth aspect, the plasma generator according to the third aspect is provided, wherein the plasma is generated in an atmospheric pressure. Even when the plasma is generated in the atmospheric pressure, discharge caused between the first electrode and the third electrode can be prevented from developing into thermal breakdown of the apparatus through a glow discharge to an arc discharge, because the insulating material or the dielectric material is interposed between the first electrode and the second electrode constituting the electrode unit.

In a seventh aspect, the plasma generator according to the third aspect is provided, wherein the electrode unit is provided in plural numbers. By providing the electrode unit in plural numbers and making the first electrode and the third electrode face with each other, the electrode part can be made multi-polarized. By making the electrode part multi-polarized, a plasma source of any shape can be formed. In addition, a discharge circuit can be made by low impedance, and therefore the plasma source with high plasma density and a large surface area can be realized.

In an eighth aspect, the plasma generator according to the third aspect is provided, wherein the electrode unit is provided in plural numbers around the third electrode. Even when the electrode unit is provided in plural numbers, thereby making multi-polarized electrode, the apparatus can be made compact by providing the plural electrode units around the third electrode.

In a ninth aspect, the plasma generator according to the third aspect is provided, wherein a protrusion portion or a recess portion or an opening hole is provided in a part of the third electrode faced with the first electrode. By providing the protrusion portion or the recess portion or the opening hole in the part of the third electrode faced with the first electrode, an electric charge is concentrated there, to thereby facilitate discharge and the plasma can be more efficiently formed.

In a tenth aspect, the plasma generator according to the third aspect is provided, wherein the first electrode is formed in a bar-shape. By forming the electrode in a bar-shape, the concentration of the electric charge is realized. Therefore, the discharge between the first electrode and the third electrode can be facilitated, and the plasma can be more efficiently formed.

In an eleventh aspect, the plasma generator according to the third aspect is provided, wherein the first electrode is formed in a cylinder-shape. By forming the first electrode in a cylinder shape, a source gas for generating plasma can be supplied and the gas generated by plasma can be obtained through the cylinder of the first electrode.

In a twelfth aspect, the plasma generator according to the third aspect is provided, wherein the insulating material or the dielectric material, or/and the second electrode are formed in a cylinder shape. By forming the insulating material or the dielectric material, or/and the second electrode in a cylinder shape, a multiple structure of covering the electrode unit with a cylinder is realized, and therefore the apparatus can be further made compact.

In a thirteenth aspect, the plasma generator according to the third aspect is provided, wherein at least the first electrode or/and the third electrode are formed of metal. By forming the electrode with metal, heat generated by discharge between the first electrode and the third electrode can be easily released.

In a fourteenth aspect, the plasma generator according to the third aspect is provided, wherein the first electrode or/and the third electrode are cooled by refrigerant. By cooling the electrode, the heat generated by discharge can be efficiently released.

In a fifteenth aspect, a substrate processing apparatus is provided, comprising:

an electrode unit constituted of a first electrode, an insulating material or a dielectric material provided around the first electrode, and a second electrode provided around the insulating material or the dielectric material;

a third electrode facing the first electrode; and a power source for applying voltage between the second electrode and the third electrode, wherein by the power source, the voltage is applied between the second electrode and the third electrode, discharge is caused between the first electrode and the third electrode, and in this discharge atmosphere, gas containing oxygen atom is supplied, and ozone is thereby generated. By using the electrode unit, assembling of the apparatus is facilitated, and a compact apparatus capable of generating ozone with high efficiency can be obtained.

In a sixteenth aspect, a substrate processing apparatus is provided, comprising:

a processing chamber for processing a substrate; and a plasma generator for generating plasma, wherein a substrate is processed by using a reactant obtained by exposing processing gas to the plasma generated by the plasma generator, the plasma generator comprising:

an electrode unit constituted of a first electrode, an insulating material or a dielectric material provided around the first electrode, and a second electrode provided around the insulating material or the dielectric material;

a third electrode facing the first electrode; and a power source for applying voltage between the second electrode and the third electrode, wherein by applying the voltage between the second electrode and the third electrode, discharge is caused between the first electrode and the third electrode, and plasma is thereby generated. By using the electrode unit, the apparatus can be easily assembled, and a compact apparatus capable of improving the processing of the substrate can be obtained by generating plasma with high efficiency.

In a seventeenth aspect, a substrate processing apparatus is provided, comprising:

a processing chamber for processing a substrate; and an ozone generator for generating ozone, wherein by using the ozone generated by the ozone generator, the substrate is processed, the ozone generator further comprising:

an electrode unit constituted of a first electrode, an insulating material or a dielectric material provided around the first electrode, and a second electrode provided around the insulating material or the dielectric material;

a third electrode facing the first electrode; and a power source for applying voltage between the second electrode and the third electrode, wherein by applying the voltage between the second electrode and the third electrode, discharge is caused between the first electrode and the third electrode, and in such a discharge atmosphere, gas containing oxygen atom is supplied, and ozone is thereby generated. By using the electrode unit, the assembly of the apparatus is facilitated, and a compact apparatus capable of improving the processing of the substrate by generating ozone with high efficiency can be obtained.

In an eighteenth aspect, a method of manufacturing a semiconductor device is provided, with a plasma generator having an electrode unit constituted of a first electrode, an insulating material or a dielectric material provided around the first electrode, and a second electrode provided around the insulating material or the dielectric material, and a third electrode facing the first electrode, the method comprising the steps of:

generating plasma by causing discharge between the first electrode and the third electrode by applying voltage between the second electrode and the third electrode; and processing a substrate by using a reactant obtained by exposing a processing gas to the plasma thus generated. By using the electrode unit and generating plasma with high efficiency, the processing of the substrate can be improved, and the semiconductor device with high quality can be manufactured.

In an nineteenth aspect, the method of manufacturing the semiconductor device according to the eighteenth aspect is provided, wherein a pulse discharge is caused between the first electrode and the third electrode by applying AC voltage between the second electrode and the third electrode, and plasma is thereby intermittently generated in the plasma generating step. By generating plasma by pulse discharge, damage to the electrode part can be further reduced in generating plasma.

In a twentieth aspect, the method of manufacturing the semiconductor device according to the eighteenth aspect is provided, wherein the substrate is processed in the substrate processing step by using ozone obtained by exposing gas containing oxygen atom to atmosphere where the discharge is caused. By generating ozone with high efficiency, the processing of the substrate is improved, and the semiconductor device with high quality can be manufactured.

In a twenty-first aspect, the method of manufacturing the semiconductor device according to the eighteenth aspect is provided, wherein the processing refers to a surface improving processing of a substrate or a thin film formed on the substrate. By generating plasma with high efficiency, an excellent surface improvement can be realized.

In a twenty-second aspect, the method of manufacturing the semiconductor device according to the eighteenth aspect is provided, wherein the processing refers to a film forming processing to form a CVD film on the substrate. By generating plasma with high efficiency, an excellent CVD film can be formed.

In a twenty-third aspect, the method of manufacturing the semiconductor device according to the eighteenth aspect is provided, wherein the processing refers to an etching processing to etch the film formed on the substrate. By generating plasma with high efficiency, an excellent film etching can be realized.

In a twenty-fourth aspect, the method of manufacturing the semiconductor device according to the eighteenth aspect is provided, wherein the processing refers to a substrate washing processing. By generating plasma with high efficiency, an excellent substrate washing can be realized.

In a twenty-fifth aspect, a method of manufacturing a semiconductor device is provided, the semiconductor device comprising:
an electrode unit constituted of a first electrode, an insulating material or a dielectric material provided around the first electrode, and a second electrode provided around the insulating material or the dielectric material; and a third electrode facing the first electrode, the method of manufacturing the semiconductor device comprising the steps of:
processing a substrate by supplying gas to the substrate;
generating plasma between the first electrode and the third electrode by applying voltage between the second electrode and the third electrode; and
decomposing an exhaust gas generated when processing the substrate by using the plasma. By generating plasma with high efficiency, an excellent exhaust gas decomposition is realized.

In a twenty-sixth aspect, a plasma discharger is provided, comprising:
an electrode part constituted of plural electrodes;
a charge storage part connected with the electrode part in series, for storing charge; and
a terminal connected to an AC power source provided in the electrode part and the charge storage part,
wherein by applying AC voltage between the electrode part and the charge storage part through the terminal, discharge is intermittently caused between the plural electrodes of the electrode part, and plasma is thereby generated. By providing the insulating material or the dielectric material around the first electrode, and providing the second electrode therearound, the first electrode which makes pair with the third electrode is unitized, and handling of the electrode part is thereby facilitated. In addition, by applying the AC voltage between the second electrode and the third electrode, when the AC voltage generated between the first electrode and the third electrode exceeds the discharge starting voltage, interelectrodes of the first electrode and the third electrode is short-circuited, thereby allowing a large current to occur, and the plasma can be formed with high efficiency.

In a twenty-seventh aspect, an electrode unit for generating plasma is provided, comprising a first electrode, an insulating material or a dielectric material provided around the first electrode, and a second electrode provided around the insulating material or the dielectric material. By applying voltage between the third electrode and the second electrode, with the first electrode constituting the electrode unit faced with the third electrode, discharge is caused between the first electrode and the third electrode, and plasma can thereby be generated. Since parts other than the third electrode for generating plasma is unitized, handling is easy.

In a twenty-eighth aspect, a plasma generator is provided, comprising:
an electrode part constituted of plural electrodes;
plural charge storage parts connected with the electrode part in series, for storing charge; and
an AC power source for applying AC voltage to a circuit, to which plural serial connection parts formed between the electrode part and the plural charge storage parts are connected in parallel,
wherein by applying the AC voltage to the circuit, to which the plural serial connection parts formed between the electrode part and the plural charge storage parts are connected in parallel, discharge is intermittently caused in each inter electrodes of the plural electrodes of the electrode part, and plasma is thereby generated.

BRIEF DESCRIPTION OF THE DRAWINGS

FIG. 3A is a vertical sectional view, and FIG. 3B is a perspective view.

FIG. 9 is an explanatory view of an electrode part constituted of a counter electrode and a floating electrode, wherein FIG. 9A is a backside view of the counter electrode, and FIG. 9B is a side view of the electrode part.

Figure 1:
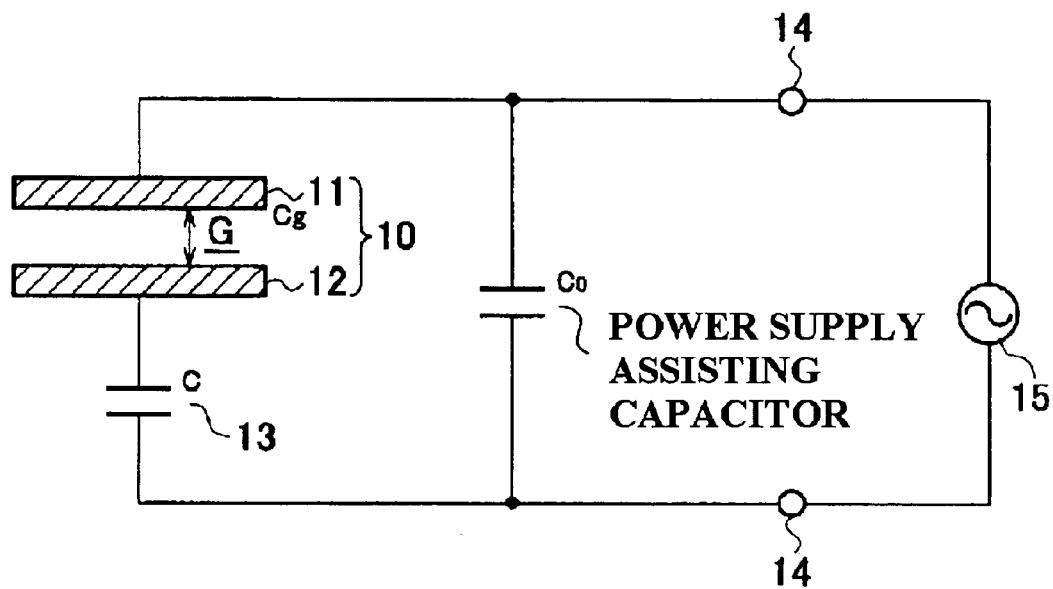
FIG. 1 is an equivalent circuit diagram of a plasma generator according to an embodiment.

DESCRIPTION OF REFERENCE NUMERALS 10 electrode part
11, 12 electrode
13 arc-extinguishing capacitor (charge storage part)
15 AC power source
20 electrode unit
22 insulating material
23 second electrode
34 counter electrode (third electrode)

BEST MODE FOR CARRYING OUT THE INVENTION

Embodiments of the present invention will be explained hereinafter.

FIG. 1 is an equivalent circuit diagram explaining a principle of a plasma generator.

A plasma generator comprises an electrode part 10 constituted of two counter electrodes 11 and 12; an arc-extinguishing capacitor 13 (capacity C) as an charge storage part connected with the electrode part 10 in series, for storing charge; terminals 14 and 14 connected to both ends of a serial circuit of the electrode part 10 and the arc-extinguishing capacitor 13; an AC power source 15 for applying AC voltage between the electrode part 10 and the arc-extinguishing capacitor 13 through the terminals 14 and 14; and a power-assisting capacitor 16 (capacity $C_O$) connected to the AC power source 15 in parallel, for assisting power by stabilizing power supply voltage. Two electrodes 11 and 12 are formed of metal electrode, for example. As metal, copper, stainless steel and so forth can be used. No dielectric material exists between the metal electrodes 11 and 12. Atmospheric air exists between the metal electrodes 11 and 12, to thereby form a capacitor (capacity Cg), and discharge is caused between the metal electrodes 11 and 12. The AC power source 15 is constituted of a high voltage AC power source, and the AC voltage is set to be about several Kv or more, and an AC frequency is set to be 50 to 10000 Hz, for example, although different depending on the size of a discharge gap G. By applying the AC voltage between the electrode part 10 and the arc-extinguishing capacitor 13 by the AC power source 15, the discharge is intermittently caused between the electrodes 11 and 12 of the electrode part 10, and the plasma is thereby generated.

Figure 2:
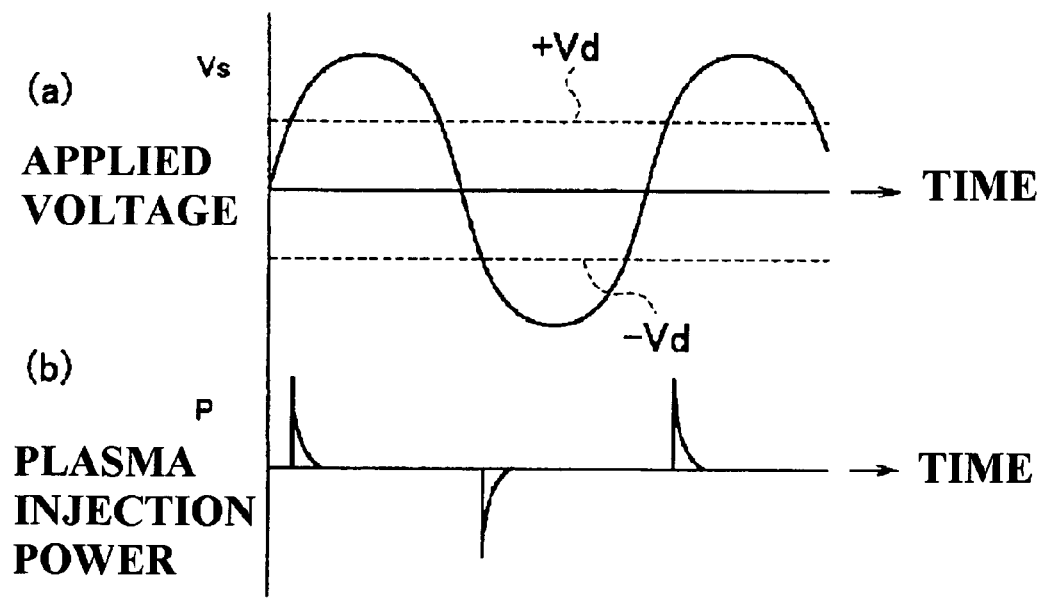
FIG. 2 is a view showing a relation between an applied voltage and a plasma injection power according to the embodiment.

A principle of causing an intermittent discharge will be explained by using FIG. 2 showing an applied voltage and a plasma injection power (corresponding to discharge current). An axis of ordinate of FIG. 2A shows the applied voltage by the high voltage AC power source 15 supplied between the electrodes 11 and 12, and meanwhile the axis of ordinate of FIG. 2B shows a plasma injection power P injected between the electrodes 11 and 12, respectively. An axis of abscissa shows a time in each of FIG. 2A and FIG. 2B. When an applied voltage $V_s$ is smaller than a discharge starting voltage $\pm V_d$ between the electrodes 11 and 12, the plasma injection power P maintains a zero level. When the applied voltage $V_s$ exceeds the discharge starting voltage $\pm V_d$, inter-electrodes 11 and 12 is virtually short-circuited, simultaneously with the start of discharge, to allow a large current to flow. Triggered by this current, storing of charge in the arc-extinguishing capacitor 13 is started. When the arc-extinguishing capacitor 13 is fully charged, the current stops flowing and the discharge thereby stops. Specifically, the discharge becomes intermittent, while the discharge is effected as long as the charge is stored in arc-extinguishing capacitor 13.

In a discharge circuit comprising the electrode part 10 constituted of the electrodes 11 and 12, and the arc capacitor 13 connected thereto in series, after discharge breakdown (ignition) between the electrodes 11 and 12, the voltage of the arc capacitor 13 is increased, and a self arc-extinguishing discharge can be executed so as to speedily extinguish an arc, simultaneously with the completion of charge. Thus, when the AC voltage is applied, short pulse discharge is repeated every half cycle. When a discharge circuit resistance is at a zero level, power injected between the electrodes 11 and 12 becomes equal to a charging energy of the arc-extinguishing capacitor 13. Accordingly, when a charge storage function to store the charge in the arc-extinguishing capacitor 13 is increased, the power injected between the electrodes 11 and 12 can be made larger, and a discharging energy density can be increased.

As described above, an electrode of the discharge circuit in the atmospheric pressure is constituted of the serial connection circuit of the electrode part 10 and the arc-extinguishing capacitor 13. Therefore, only by applying the AC voltage, the discharge becomes the self arc-extinguishing discharge of extinguishing arc before switching from a glow discharge to an arc discharge, with little damage to the electrode part 10. In addition, no dielectric material exists between the electrodes 11 and 12, and inter-electrodes 11 and 12 is short-circuited at starting discharge, thereby realizing a quick large current discharge. Therefore, the discharging energy density is larger than the silent discharge, and plasma can be formed in the atmospheric pressure with high efficiency.

In addition, the discharge current is limited by electrostatic capacity of the arc-extinguishing capacitor 13 connected to the electrode part 10, the electrode part 10 serving as a plasma source is released from the constrains. Therefore, the plasma source becomes free from the constrains of the shape of the electrodes 11 and 12, which is required for determining the electrostatic capacity for limiting the discharge current. Accordingly, compared with the RF discharge system in which the electrostatic capacity liming the discharge current is determined by the shape of the electrode, flexibility in designing of the plasma source can be increased.

Moreover, in the apparatus incorporating the discharge circuit to intermittently cause discharge between the electrodes 11 and 12 of the electrode part 10, the ozone generator for generating ozone $O_3$ by supplying the gas containing oxygen atom $O_2$ in the discharge atmosphere can be constituted.

In this way, in the aforementioned self arc-extinguishing discharge system, the electrode part 10 and the arc-extinguishing capacitor 13 are connected in series. However, specifically, the electrode of the electrode part 10 and the arc-extinguishing capacitor 13 may be separated from each other, although it is also possible to integrally form the electrode of the electrode part 10 and the arc-extinguishing capacitor 13.

Figure 3:
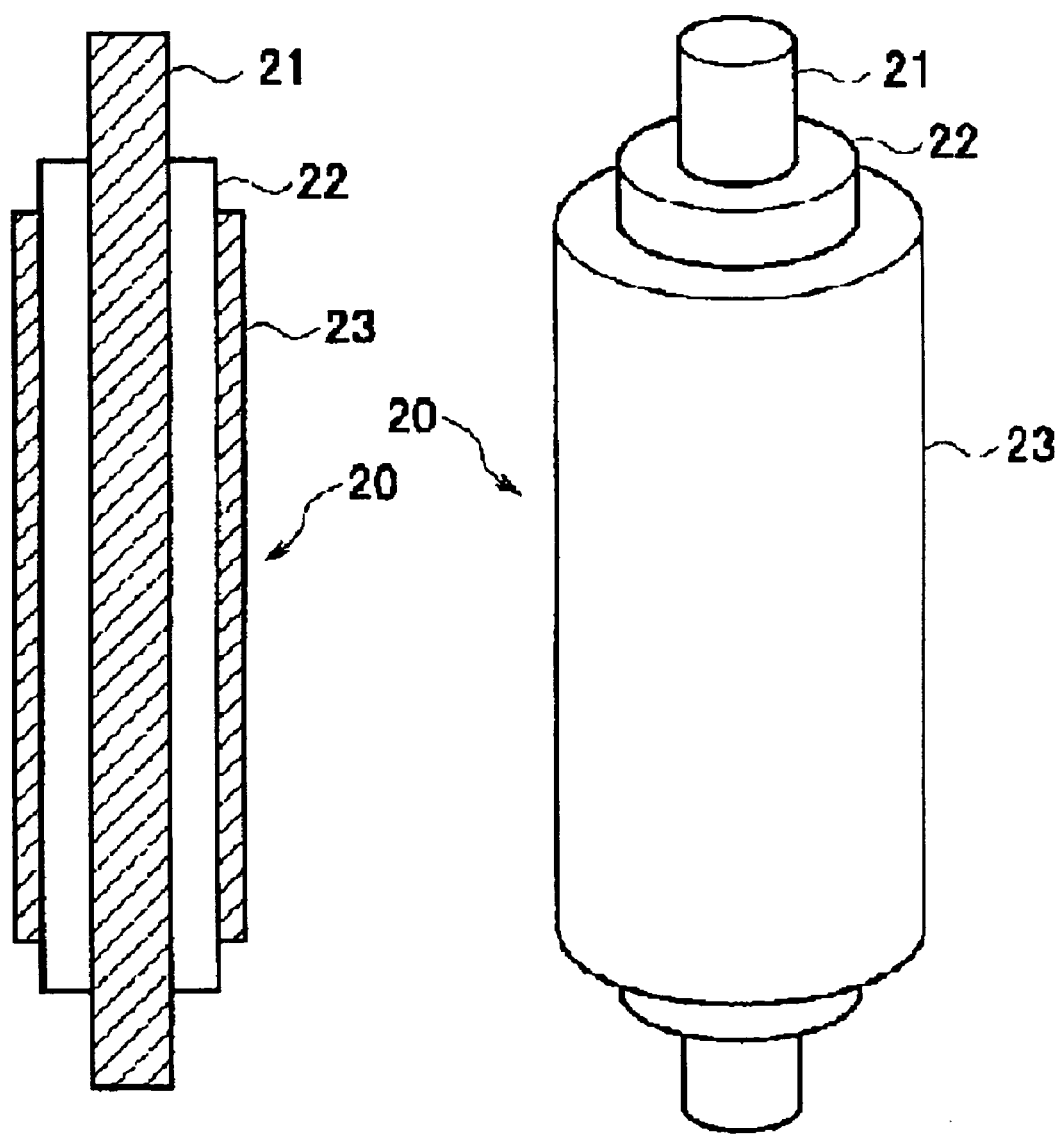
FIG. 3 is a block diagram of a capacitive coupling electrode according to the embodiment.

FIG. 3 shows a block diagram of the electrode unit in which an electrode 12 which is one of the electrodes constituting the electrode part 10 and the arc-extinguishing capacitor 13 are integrally formed. Here, the electrode unit is called a capacitive coupling electrode. A capacitive coupling electrode 20 means that capacity C constituted of a floating electrode 21, an insulating material 22, and a grounding electrode 23 is coupled to the floating electrode 21. FIG. 3A is a vertical sectional view of the capacitive coupling electrode 20, and FIG. 3B is a perspective view of the capacitive coupling electrode 20. The capacitive coupling electrode 20 is constituted of the floating electrode 21 as a first electrode, the insulating material 22 provided around the floating electrode 21, and the grounding electrode 23 as a second electrode provided around the insulating material 22. Specifically, the floating electrode 21 formed of metal having a bar shape is arranged in the center as a core so as to be an electrically isolated state from the entire discharge circuit, the insulating material 22 is wound around the core in a cylinder shape so as to surround this core, and further the grounding electrode 23 made of metal having a cylinder shape is wound around the outside of the insulating material 22. The insulating material 22 may be a dielectric material, or may be constituted by paper or cloth, and so forth, containing an electrolyte. The floating electrode 21 becomes one of the electrodes constituting the electrode part 10, and a capacitor having capacity C constituted of the floating electrode 21, the insulating material 22, and the grounding electrode 23 becomes the aforementioned arc-extinguishing capacitor 13. In this way, one of the electrodes constituting the electrode part and the arc-extinguishing capacitor are integrally constituted. This contributes to preparing a compact capacitive coupling electrode 20.

A specific example of the capacitive coupling electrode is shown as follows. A silicone thermal contraction tube as the dielectric material is wound around a copper rod of Φ 2 mm having a predetermined length, and a copper foil is wound thereon. Capacity of the arc-extinguishing capacitor is 20 Pf at 100 kHz. Note that Teflon thermal contraction tube may be used as the dielectric material other than the silicone thermal contraction tube.

By using the capacitive coupling electrode 20, the substrate processing apparatus equipped with the plasma generator, the ozone generator, and a plasma/ozone generator can be constituted. Further, by using the plasma generator, the method of manufacturing the semiconductor device to perform substrate processing can be executed.

The aforementioned capacitive coupling electrode 20 can be made multi-polarized by aligning in plural numbers. Generally, the capacitive coupling electrode 20 is not singly used, but the plasma generator is constituted by aligning plural capacitive coupling electrodes 20 in parallel.

Figure 4:
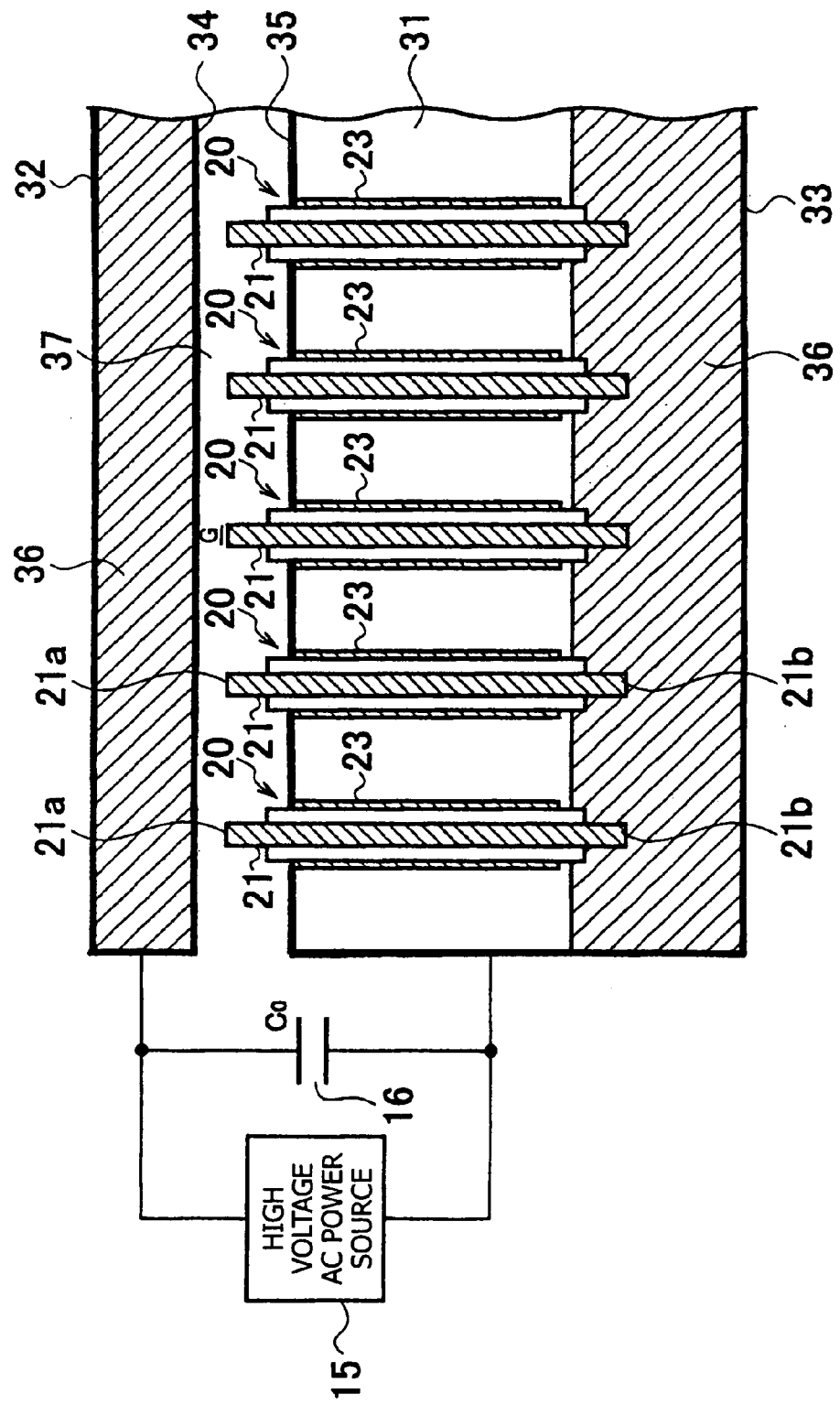
FIG. 4 is a view showing a multi-polarized structure according to the embodiment in which plural capacitive coupling electrodes are arranged.

FIG. 4 shows an example of a basic structure of such a multi-polarized plasma generator, in which each floating electrode 21 and counter electrodes 34 common thereto are brought into contact with a refrigerant 36 to release heat which is generated in the discharge electrode by discharge. When ozone $O_3$ is generated from oxygen $O_2$ by using the plasma generator, the ozone thus generated is not required to be thermally decomposed, and therefore it is particularly effective to cool the electrodes 34 and 21. Note that FIG. 4 shows the basic structure, and therefore an outer shape of the entire body of the apparatus is omitted. Detailed explanation will be followed hereunder.

The plasma generator comprises an insulating block 31 in a center portion, an upper refrigerant jacket 32 in an upper portion, and a lower refrigerant jacket 33 in a lower portion, respectively. The plural capacitive coupling electrodes 20 are fixed to the insulating block 31 in an upright state. The insulating block 31 is covered by a metal common grounding electrode 35, and by the common grounding electrode 35 grounding electrodes 23 of the plural capacitive coupling electrodes 20 are connected in parallel. In addition, the insulating block 31 is formed of the insulating material such as PFC (perfluorocarbon), and the lower refrigerant jacket 33 filled with a refrigerant 36 is provided in the lower portion. The plural capacitive coupling electrodes 20 are buried in the insulating block 31, so that one end 21a of each floating electrode 21 constituting the capacitive coupling electrode 20 protrudes in a discharge space 37 formed between the capacitive coupling electrode 20 and a common counter electrode 34 from an upper surface of the insulating block 31, and the other end 21b is in contact with the refrigerant 36 of the lower refrigerant jacket 33. The floating electrode 21 is cooled by the refrigerant 36 in the lower refrigerant jacket 33. Height of one end 21a of each floating electrode 21 protruded from the upper surface of the insulating block 31 is adjusted so as to have the same surface level. The discharge space 37 in which plural floating electrode 21 protrude with the same surface level is formed in a straight state. The upper refrigerant jacket 32 is filled with the refrigerant 36 inside. The refrigerant jacket 32 is arranged in such a manner as to face one end 21a of the protruded floating electrode 21. The entire surface of the upper refrigerant jacket 32 is formed of a metal counter electrode 34, and the counter electrode 34 is cooled by the refrigerant in the upper refrigerant jacket 32.

A high voltage AC power source 15 is connected between the counter electrode 34 and the grounding electrode 23, and the power assisting capacitor 16 is connected to the high voltage AC power source 15 in parallel. In order to stably apply the high voltage AC power supply, capacity $C_0$ of the power supply assisting capacitor 16 may be set satisfying the formula as follows:

$$C_0 = \Sigma C_i \quad \text{(Formula 1)}$$

where $C_i$ is the arc-extinguishing capacity of the capacitive coupling electrode 20, and $\Sigma C_i$ is a total sum of the arc-extinguishing capacity of the capacitive coupling electrode 20 connected in parallel.

By applying high voltage AC power supply, discharge is caused in each discharge gap G between the counter electrode 34 and the floating electrode 21, and the plasma is thereby generated. At this time, heat is generated in the counter electrode 34 and the floating electrode 21, however the electrodes 34 and 21 thus generating heat are cooled by being brought into contact with the refrigerant 36. When the counter electrode 34 and the floating electrode 21 are formed of metal, the heat can be easily removed by cooling.

Figure 24:
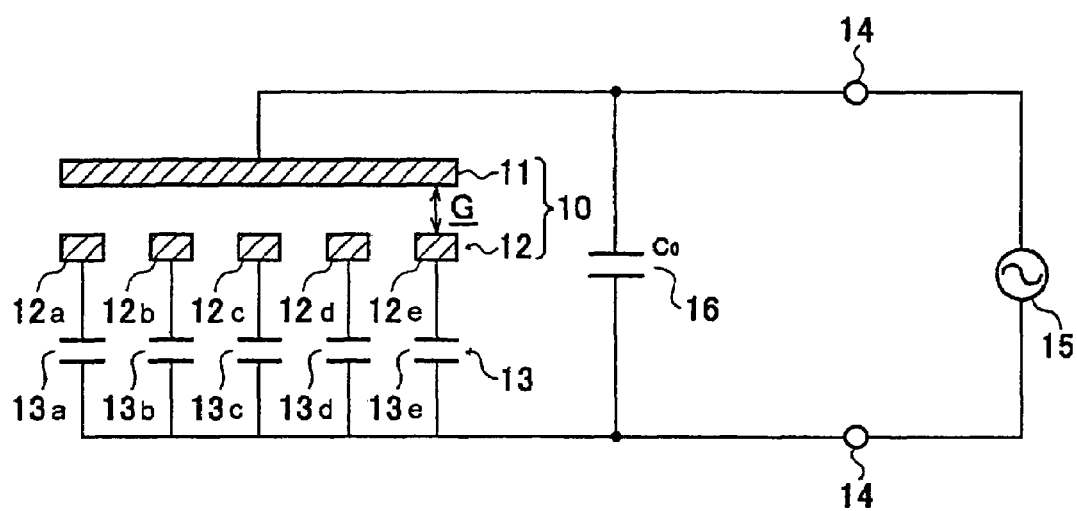
FIG. 24 is an equivalent circuit diagram of the multi-polarized plasma generator of FIG. 4

FIG. 24 is an equivalent circuit diagram of the multi-polarized plasma generator of FIG. 4. The plasma generator comprises an electrode part 10 constituted of one counter common electrode 11 and plural individual electrodes 12 (12a to 12e); arc-extinguishing capacitors 13 (13a to 13e) (capacity C) as plural charge storage parts connected in series with the plural individual electrodes 12 constituting the electrode part 10, for storing charge; terminals 14 and 14 connected to both ends of a circuit in which a serial connection part of the electrode part 10 and the arc-extinguishing capacitor 13 are connected in parallel; an AC power source 15 for applying AC voltage between the electrode part 10 and the arc-extinguishing capacitor 13 via the terminals 14 and 14; and a power supply assisting capacitor 16 (capacity $C_0$) connected to the AC power source 15 in parallel, for assisting power supply by stabilizing the power supply voltage. The one common electrode 11 and the plural electrodes 12 are formed of metal electrode, for example. As such metal, copper and stainless steel and so forth can be used. No dielectric material exists between the metal electrodes 11 and 12. The atmospheric air exists between the metal electrodes 11 and 12, to thereby form a capacitor (capacity Cg), and the discharge is thereby caused between the metal electrodes 11 and 12. The AC power source 15 is formed of high voltage AC power source, and although different according to the size of the discharge gap G, the AC voltage is, for example, about several kV or more and an AC frequency is from 50 to 10000 Hz. By applying the AC voltage between the electrode part 10 and the arc-extinguishing capacitor 13 by the AC power source 15, discharge is intermittently caused between the plural electrodes 11 and 12 of the electrode part 10, and plasma is thereby generated.

Figure 5:
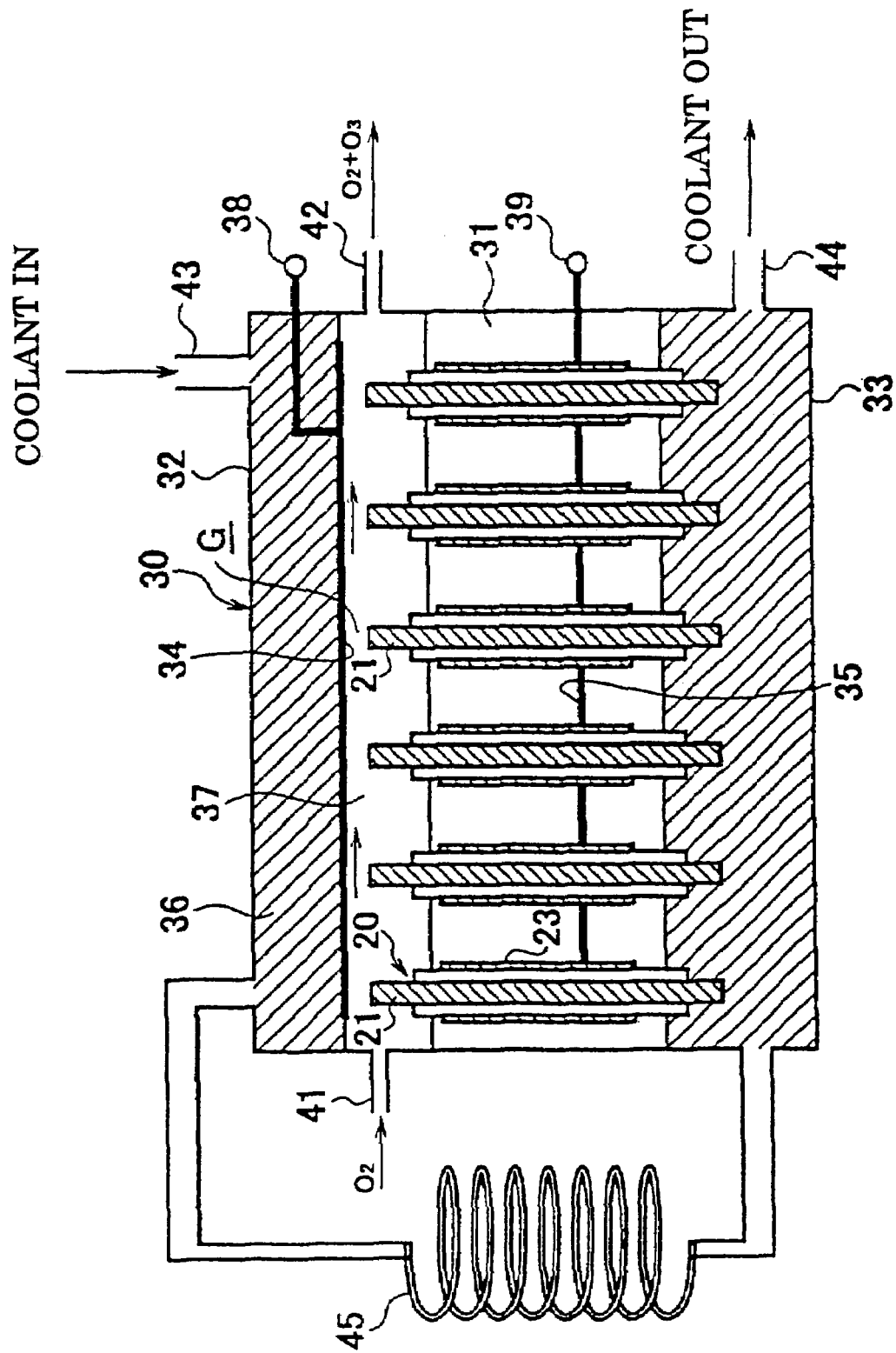
FIG. 5 is an entire block diagram of a multi-polarized plasma generator in which the plural capacitive coupling electrodes according to the embodiment are arranged.

FIG. 5 specifically shows a block diagram of the aforementioned multi-polarized plasma generator applied to the ozone generator.

The ozone generator comprises a container 30 containing the aforementioned upper and lower refrigerant jackets 32 and 33 and the insulating block 31. The counter electrode 34 is not provided on the entire surface of the upper refrigerant jacket 32, but commonly provided only on the counter surface to the floating electrode 21, and connected to a terminal 38 which is one of the terminals for high voltage AC power supply provided outside the container 30 in such a manner as to be taken out from the container 30. Also, the common grounding electrode 35 is not provided around the insulating block 31, but provided inside of the insulating block 31, in the profile of connecting the grounding electrode 23 of each capacitive coupling electrode 20 in parallel, and is taken out from the container 30 and connected to the terminal 39 which is the other terminal for high voltage AC power supply provided outside the container 30. In the container 30, a supply port 41 for supplying $O_2$ communicating with the discharge space 37 in a straight form and an exhaust port 42 for exhausting ozone are provided. In addition, a refrigerant supply port 43 is provided in the upper refrigerant jacket 32, and a refrigerant exhaust port 44 is provided in the lower refrigerant-jacket 33. Then, by connecting the upper refrigerant jacket 32 and the lower refrigerant jacket 33 by a coil-shaped refrigerant pipe 45 outside the container 30, the refrigerant 36 such as pure water is circulated.

The high voltage AC power source is connected between the terminal 38 connected to the common counter electrode 34, and the terminal 39 connected to the grounding electrode 23 of the capacitive coupling electrode 20 through the common grounding electrode 35, discharge is caused between each floating electrode 21 and the counter electrode 34. When the voltage is applied between the terminals 38 and 39, as explained in FIG. 2, the discharge is caused at the discharge starting voltage between the electrodes 34 and 21. However, such a discharge is terminated simultaneously with completion of the charge into the arc-extinguishing capacitor mounted to the capacitive coupling electrode 20. As shown in FIG. 5, when the plasma generator is multi-polarized, the discharge is caused between the electrodes 34 and 21 of each of the capacitive coupling electrodes 20, before and behind each other, and the arc is extinguished after constant elapsed time. This is because there is a variation in discharge gap G. When oxygen $O_2$ or dry air is supplied to the discharge space 37 from the supply port 41, the oxygen $O_2$ is efficiently converted into ozone mixed gas $(O_2+O_3)$ in the discharge space 37, and exhausted from the exhaust port 42 of the container 30. According to this embodiment, by making the plasma generator multi-polarized by using plural capacitive coupling electrodes 20, the plasma source having large area can be realized. In addition, the capacitive coupling electrodes 20 are connected in parallel, and this contributes to forming the discharge circuit by low impedance, thereby realizing the plasma source having high density and large area. Accordingly, ozone can be generated with high efficiency.

Also, according to this embodiment, plural electrode parts are arranged point to point so as to be longitudinally arrayed or developed in a plane, constituted of the floating electrodes 21 arranged by protruding, and a counter part of the counter electrode 34 opposed to the floating electrodes 21. In the silent discharge and the RF discharge, when even one place exists between parallel flat electrodes, which becomes narrow due to distortion or bent and on which the charge is likely to be concentrated, the discharge is deviated due to concentration of the charge, and it is unavoidable that the plasma is un-uniformly produced. Meanwhile, contrary to the above case, in the embodiment, totally uniform plasma is formed by making the charge concentrated on the dotted electrode parts formed with the counter part of the counter electrode, to deviate the discharge per each unit of capacitive coupling electrode, thereby generating plasma with high efficiency. In addition, a totally un-uniform plasma is formed by making the electrode parts multi-polarized so as to be longitudinally arrayed or developed in a plane. Accordingly, the parallel flat electrode is not required like the silent discharge and the RF discharge, and even if the distortion or bent is generated in the common counter electrode 34, a large current discharge is ensured at each electrode part, and therefore the plasma source having high density and large area can be realized.

Note that as the refrigerant 36, a material of high insulation such as pure water needs to be used so as not to short-circuit between the electrodes 34 and 21, or by interposing the insulating material between the refrigerant 36 and the electrode 34, and between the refrigerant 36 and the floating electrode 21, the refrigerant 36 is prevented from directly touching on the electrodes 34 and 21. In the figure, by forming the refrigerant pipe 45 connecting the electrodes 34 and 21 touching on the refrigerant jackets 32 and 33, into a coil shape, the refrigerant has a reactance component, thereby having an insulation property in terms of high frequency. Moreover, as a source gas for generating ozone, oxygen $O_2$ is predominantly used. However, the oxygen is not required to be 100%. Inert gas such as Ar and $N_2$ may be contained in dry air or oxygen $O_2$ for stabilizing plasma.

Incidentally, as one of the arrangement of the plural capacitive coupling electrodes 20, the plural capacitive coupling electrodes 20 are erected along a gas flow direction, as shown in FIG. 4 and FIG. 5, and arrayed in a straight line by arranging the height of each head. However, the arrangement is not limited thereto but several modified examples are considered as follows. For example, the capacitive coupling electrodes may be arrayed with further planar spread, or may be arrayed so as to lie on the same plane. Various specific examples of such an arrangement are shown From FIG. 6 to FIG. 8.

Figure 6:
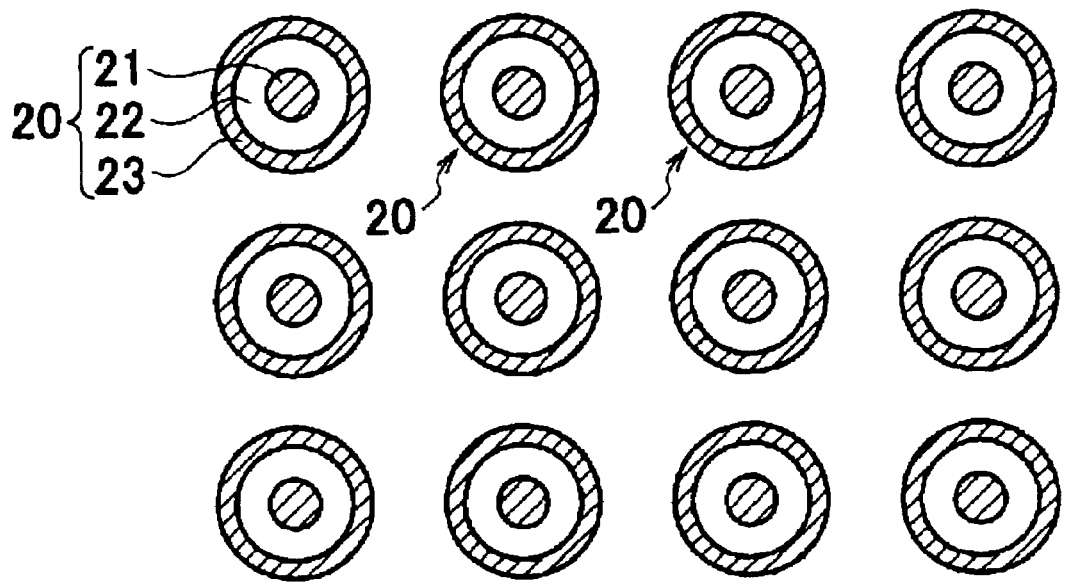
FIG. 6 is a plan view of an example of a multi-polarized arrangement according to the embodiment.

FIG. 6 is a plan view of the arrangement of the capacitive coupling electrode having planar spread. The erected capacitive coupling electrodes 20 are arranged on a grid. According to such an arrangement, discharge area can be expanded in a plane form, and the plasma source having high density and large area can thereby be realized.

Figure 7:
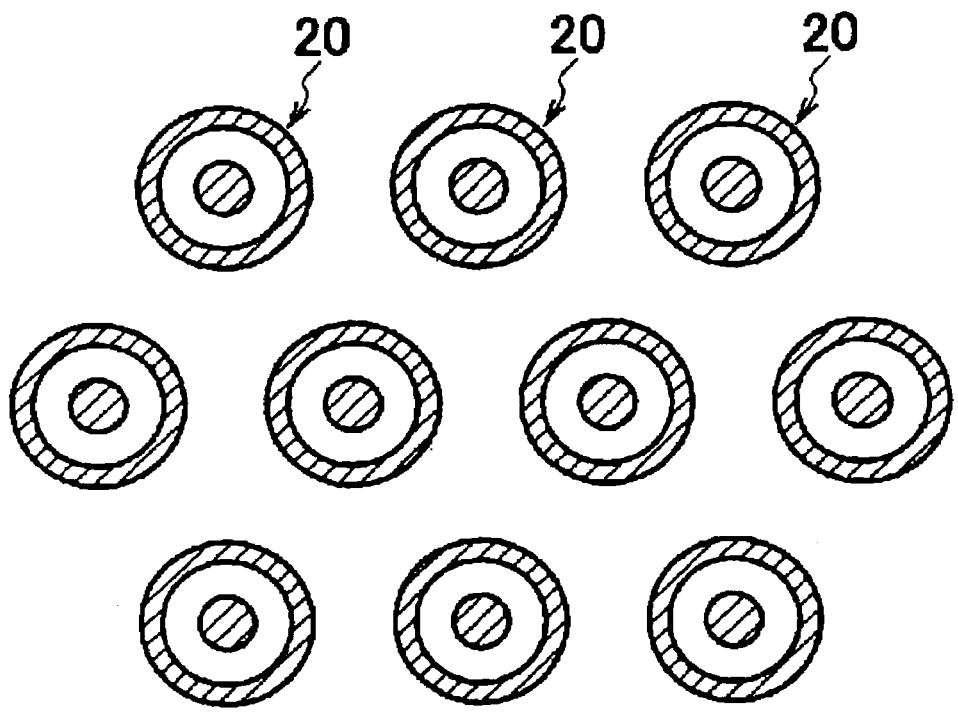
FIG. 7 is a plan view of the example of the multi-polarized arrangement according to the embodiment.

FIG. 7 is also a plan view of the arrangement of the capacitive coupling electrode having planar spread. However, the plural rows of erected plural capacitive coupling electrodes 20 are lined up in a lateral row, and the position of the capacitive coupling electrode 20 of the adjacent row corresponding to the gap is deviated, so as to fill the gap between the capacitive coupling electrodes of each row. Thus, even when the gas slips through one of the capacitive coupling electrode parts 20, does not fail to pass through the other capacitive coupling electrode 20. This contributes to the plasma source having higher density and larger area.

Figure 8:
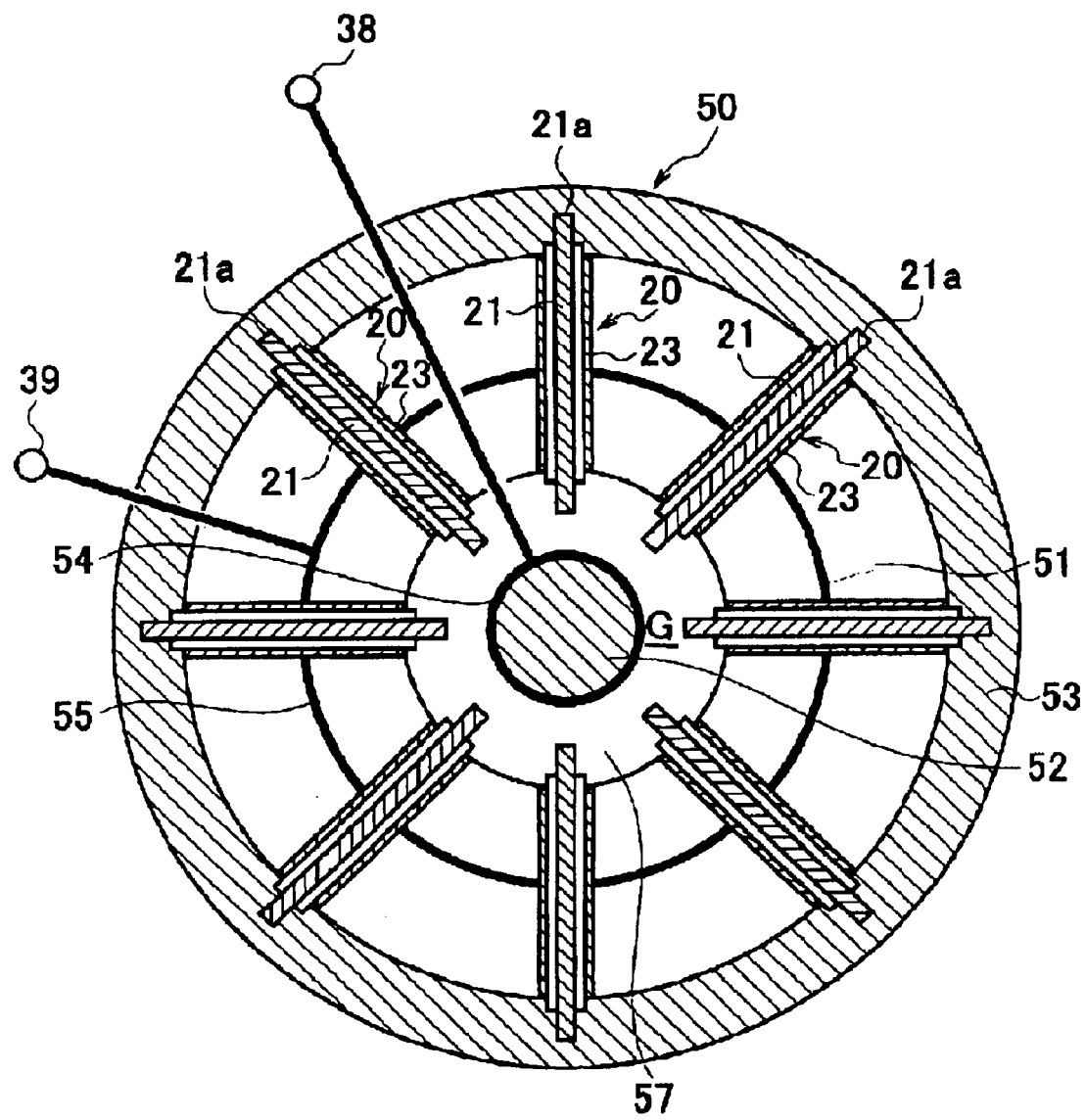
FIG. 8 is a sectional view of the multi-polarized arrangement according to the embodiment.

FIG. 8 is a plan view of the arrangement of the capacitive coupling electrodes arrayed on the same plane. Note that in this case, the arrangement of the capacitive coupling electrodes 20 is not limited to a planar array but can be enlarged in a 3-dimensional array by laminating the capacitive coupling electrodes 20.

In this arrangement, a cylindrical container 50 is provided for maintaining the axial direction of the capacitive coupling electrode 20 in a diameter direction. A circular inside refrigerant jacket 52 is arranged in a center portion of the cylindrical container 50, an annular insulating block 51 is concentrically arranged outside the inside refrigerant jacket 52, and an outside refrigerant jacket 53 is concentrically arranged outside the insulating block 51. In the annular insulating block 51, plural capacitive coupling electrodes 20 are radially arranged, with the circular inside refrigerant jacket 52 as a center. In addition, a cylindrical common counter electrode 54 is provided on an outer periphery of the inside refrigerant jacket 52, so as to be connected to one terminal 38 for the high voltage AC power source. A common grounding electrode 55 is provided in an inner part of the annular insulating block 51 so as to connect the grounding electrodes 23 constituting each capacitive coupling electrode 20 in parallel. Then, the common grounding electrode 55 is connected to the other terminal 39 for the high voltage AC power source. The common counter electrode 54 is cooled by the inside refrigerant jacket 52, and the floating electrode 21 of the capacitive coupling electrode 20 is cooled by the outside refrigerant jacket 53, respectively.

Note that connection lines to the terminals 38 and 39 for high voltage AC power source from each electrode 54 and 55 are shown in the figure for convenience. However, actually such connection lines are arranged so as to be connected to gas lead-in side or gas lead-out side provided on an end portion of the container not shown. A discharge space 57 formed between the common counter electrode 54 and the insulating block 51, into which one end 21a of the floating electrode 21 protrudes and through which gas passes, is formed in an annular shape or a deep cylindrical shape. When the generator with this arrangement is used as the ozone generator, the supplied oxygen $O_2$ passes through the discharge space 57 in a vertical direction with respect to the sheet surface of FIG. 8. This embodiment is different from the structure of FIG. 5 only in the arrangement of the capacitive coupling electrode 20, and operation and other features are the same as those of FIG. 5.

According to an example of the arrangement of the capacitive coupling electrode of this embodiment, by radially arranging the plural capacitive coupling electrodes, the plasma generator or the ozone generator can be formed in a cylindrical shape in the same way as the gas supply pipe. This is considered to be an essential factor to make the apparatus compact.

Note that as the arrangement of the capacitive coupling electrodes 20, it can be arrayed in a helical state or in a laminar state, other than the aforementioned radial state. In addition, the common counter electrode 54 may not be formed into a cylindrical shape but may be formed into a solid bar shape, when it is not required to be cooled from inside. In this case, preferably, the bar-shaped common counter electrode 54 is cooled from outside by making the end portion of the bar-shaped common counter electrode 54 touch on the refrigerant. Also, in the case of this embodiment, the capacitive coupling electrodes 20 shown in the figure can be arranged in a three dimensional array as shown in FIG. 6 or FIG. 7. In addition, in stead of forming the capacitive coupling electrodes 20 shown in the figure into a bar shape, but it can be formed into a plane shape extending in a direction perpendicular to the face of the sheet, and the container 50 can be formed into a cylindrical shape. Further, with the capacitive coupling electrode 20 in a state of bar shape, it may not arranged in a three dimensional array but arranged in a single array on the same surface, to thereby form the container 50 into a flat structure without depth.

In the aforementioned embodiment, not only the counter part but also the whole surface of the counter electrode is formed by a flat surface in each of the common counter electrodes 34 and 54 arranged so as to face the floating electrode 21, although not limited to the flat surface. For example, the counter part may be formed in protrusion or recess, or opening hole may be provided.

Figure 9:
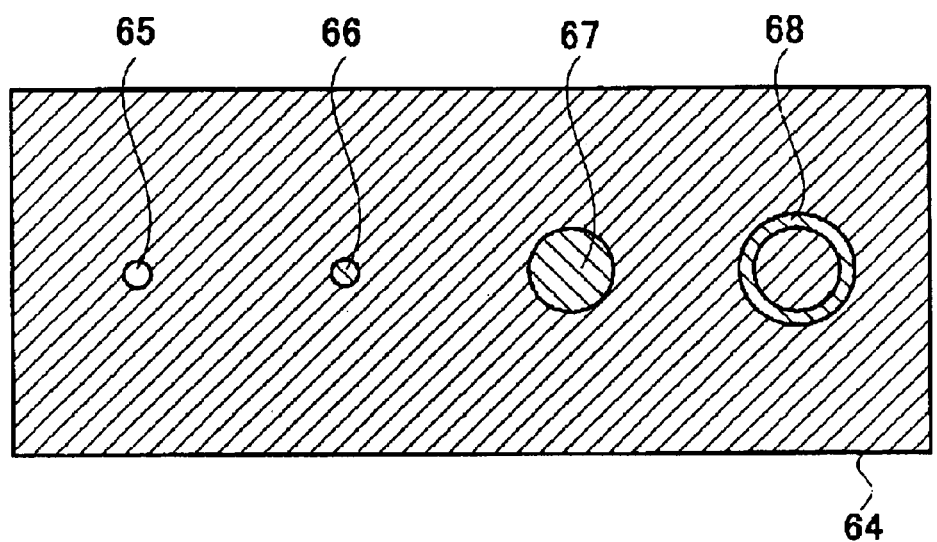
Figure 9:
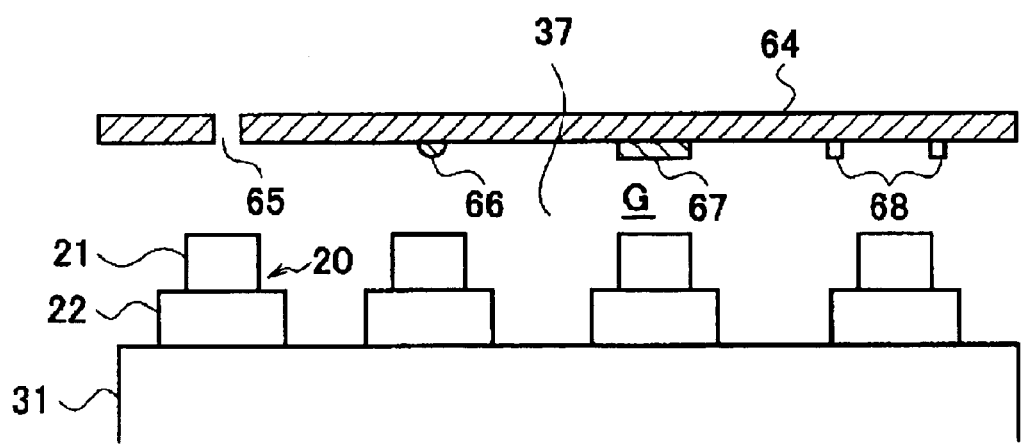

FIG. 9 shows an example of the counter electrode 64 having such protrusion/recess parts. FIG. 9A is a backside view of the counter electrode 64 viewed from the side of the floating electrode 21, and FIG. 9B is a sectional view of the counter electrode 64 and a side view of the floating electrode 21 viewed from the side. In the counter part nearest to the floating electrode 21, the counter electrode 64 may have provided thereon an opening hole 65 passing through the common counter electrode 64, a semi-spherical protrusion 66, a bar-shaped protrusion 67, a ring-shaped protrusion 68 recessed in the center. The discharge from the flat surface without protrusion/recess is hard to be caused. However, by intentionally preparing the aforementioned opening holes 65 and the protrusions 66 to 68, so as to induce discharge from these parts, the charge can be concentrated on the opening hole 65 and the protrusions 66 to 68, and the discharge from side of the counter electrode 64 can be facilitated. Accordingly, the plasma can be further efficiently generated.

Figure 10:
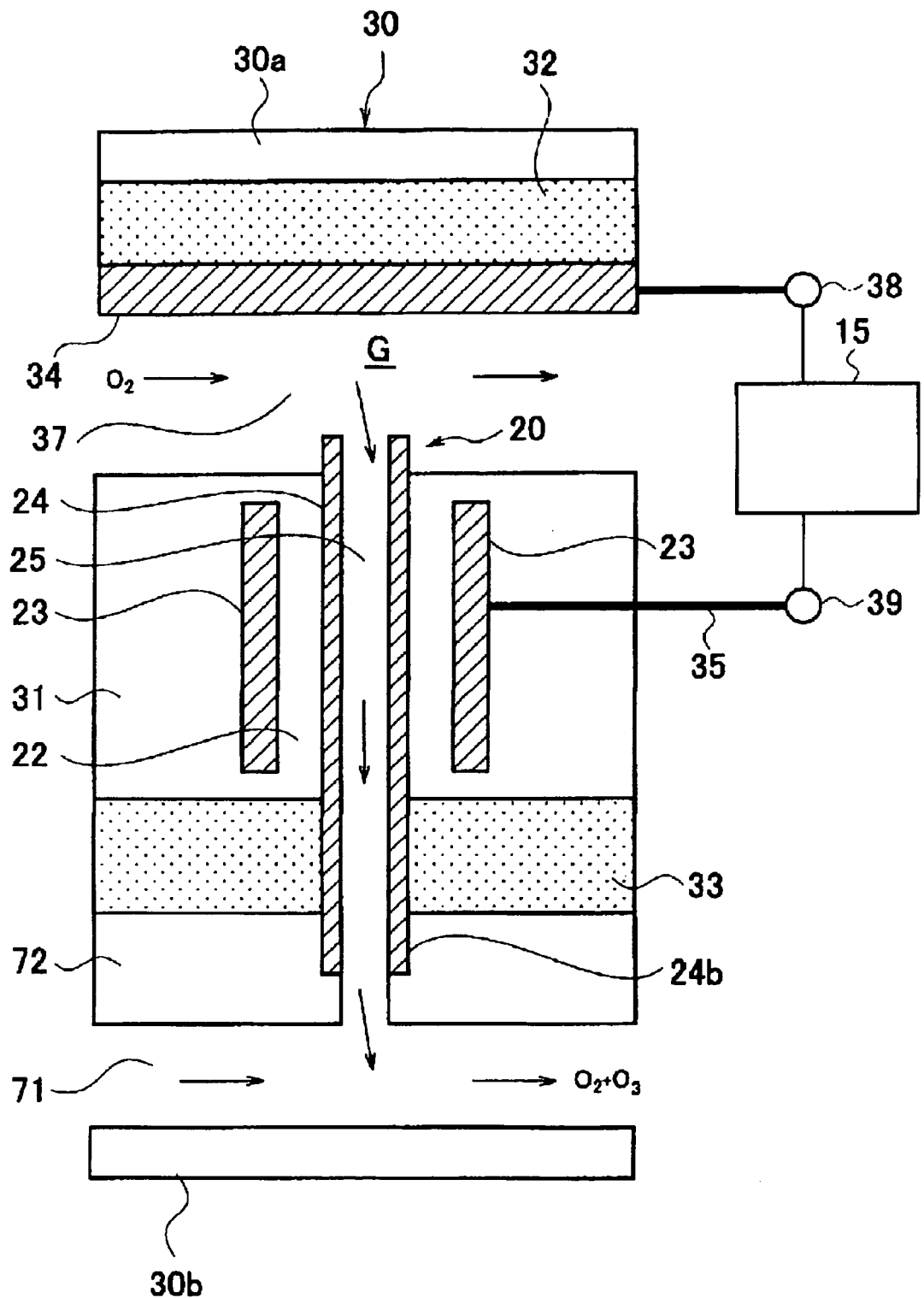
FIG. 10 is an explanatory view showing a gas lead-in method according to the embodiment.
Figure 13:
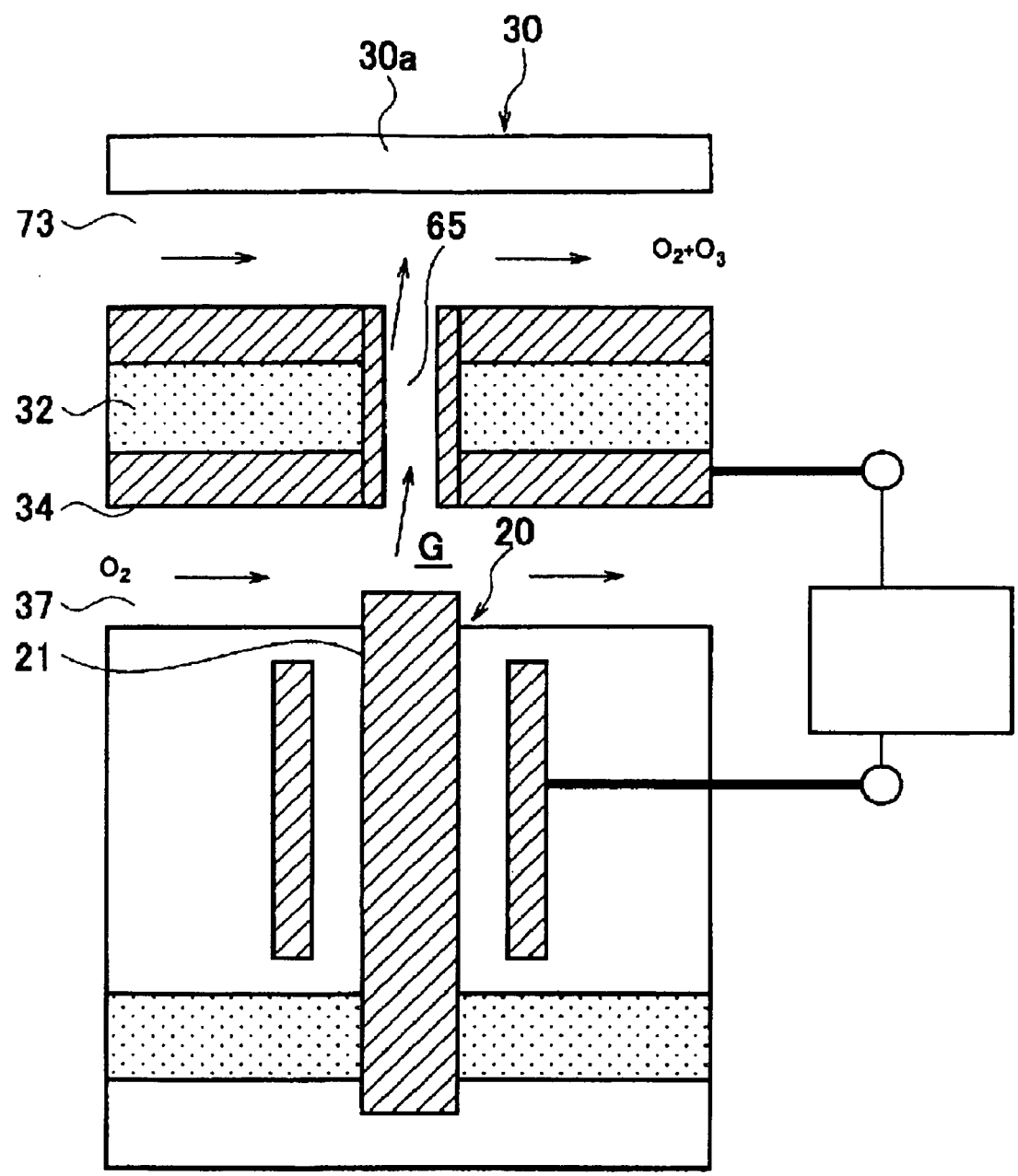
FIG. 13 is an explanatory view showing the gas lead-in method according to the embodiment.

In the aforementioned embodiment, explanation is given to a case of a gas lead-in direction to the discharge space 37, in which the gas flows linearly in one direction. However, when the floating electrode 21 of the capacitive coupling electrode 20 is formed in a cylindrical shape, and a gas flow path is formed in the floating electrode 21 thus formed, or when the opening hole 65 for charge concentration is provided on the counter electrode 64 as described above, the gas lead-in direction can be changed so as to flow on nonlinear line. FIG. 10 and FIG. 13 show the modification example of such a gas lead-in direction. Note that in these figures, the capacitive coupling electrode 20 is shown by picking up one of the multi-polarized arrays thereof, for convenience.

In FIG. 10, the floating electrode 24 is formed in a cylindrical shape, having the flow path 25 inside, and the gas generated as a reactant such as ozone $O_3$ is obtained through the floating electrode 24. Basic structure of FIG. 10 is the same as that of FIG. 5, and a different point is that the floating electrode 24 is formed in a cylindrical shape as described above. In addition, a lower end 24b of the floating electrode 24 of the opposite side constituting the capacitive coupling electrode 20 is extended so as to pass through the lower refrigerant jacket 33, and a lower space 71 for flowing the gas thus generated is formed in an end point of the extension, separately from the discharge space 37 formed in an upper end of the floating electrode 24. A lower wall 30b of the container is surrounded by a second insulating block 72, the lower refrigerant jacket 33 being formed by the insulating block 31 and the second insulating block 72.

By leading-in oxygen $O_2$ as a source gas into the discharge space 37 above the floating electrode 24 including the discharge gap G, ozone $O_3$ as a generated gas is generated by the discharge gap G. Then, the ozone $O_3$ thus generated is made to flow to the lower space 71 under the floating electrode 24 through the cylindrical floating electrode 24, and taken out from the apparatus. In this case, when the electrode part is made multi-polarized, a part of oxygen as a source gas is led-out together with ozone $O_3$, thereby reducing the number of times the oxygen $O_2$ touches on plasma. However, the generated ozone $O_3$ is quickly led-out, and therefore possibility that the generated ozone $O_3$ is decomposed by a foreign matter and heat is reduced instead.

Figure 11:
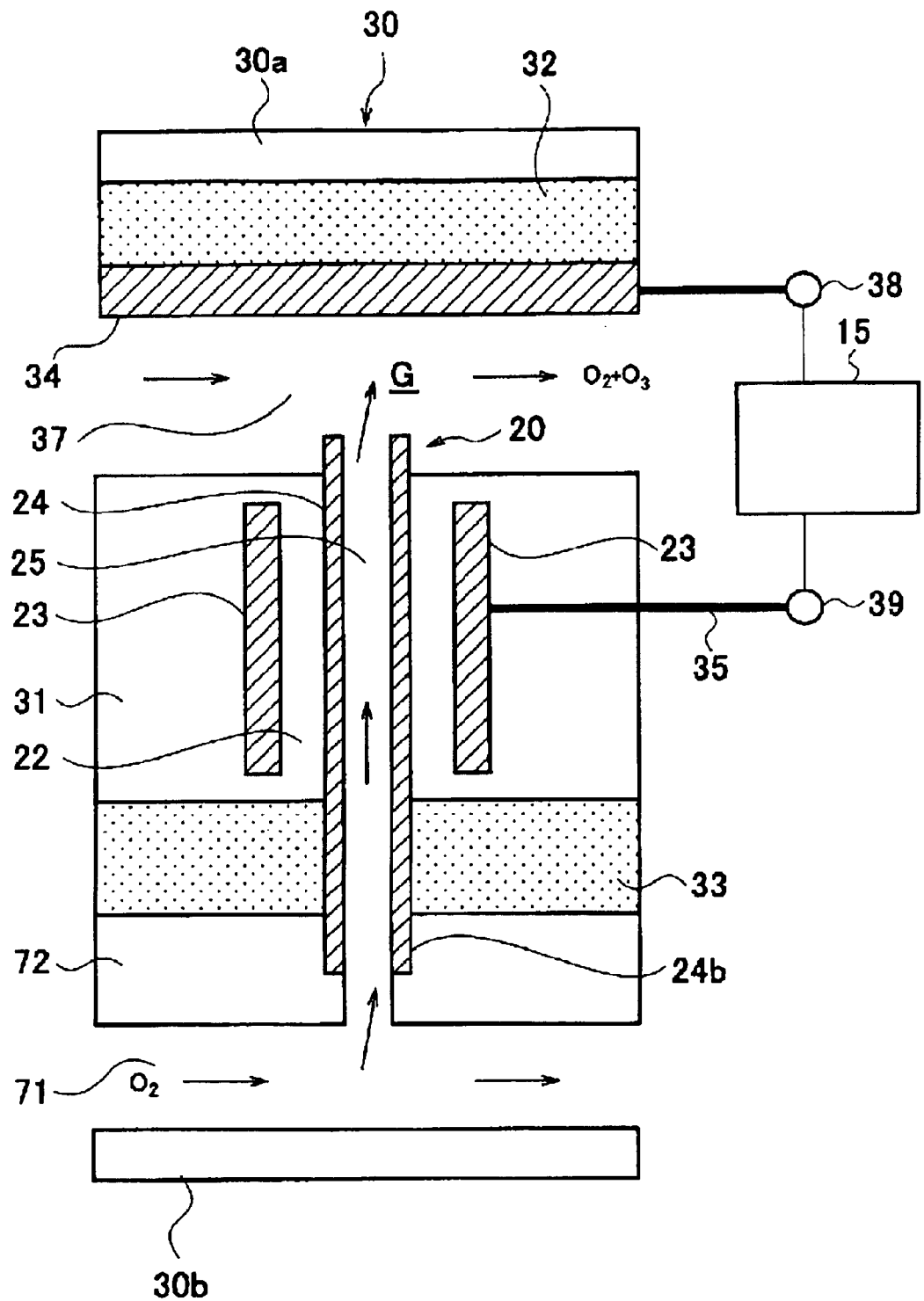
FIG. 11 is an explanatory view showing the gas lead-in method according to the embodiment.

The structure of FIG. 11 is the same as that of FIG. 10, however, the different point is that in FIG. 11, the oxygen $O_2$ as a source gas is supplied through the cylindrical floating electrode 24. The source gas is made to flow to the lower space 71 under the floating electrode 24, and led-in the discharge space 37 through the floating electrode 24. The gas $O_3$ thus generated flows in the discharge space 37 above the floating electrode 24 including the discharge gap G. In this case, most of the oxygen $O_2$ as a source gas is led-in between the electrodes 34 and 24, and therefore the number of times the oxygen $O_2$ touches on plasma is increased. However, the possibility that the ozone $O_3$ thus generated is decomposed by a foreign matter and heat is also increased, instead.

Figure 12:
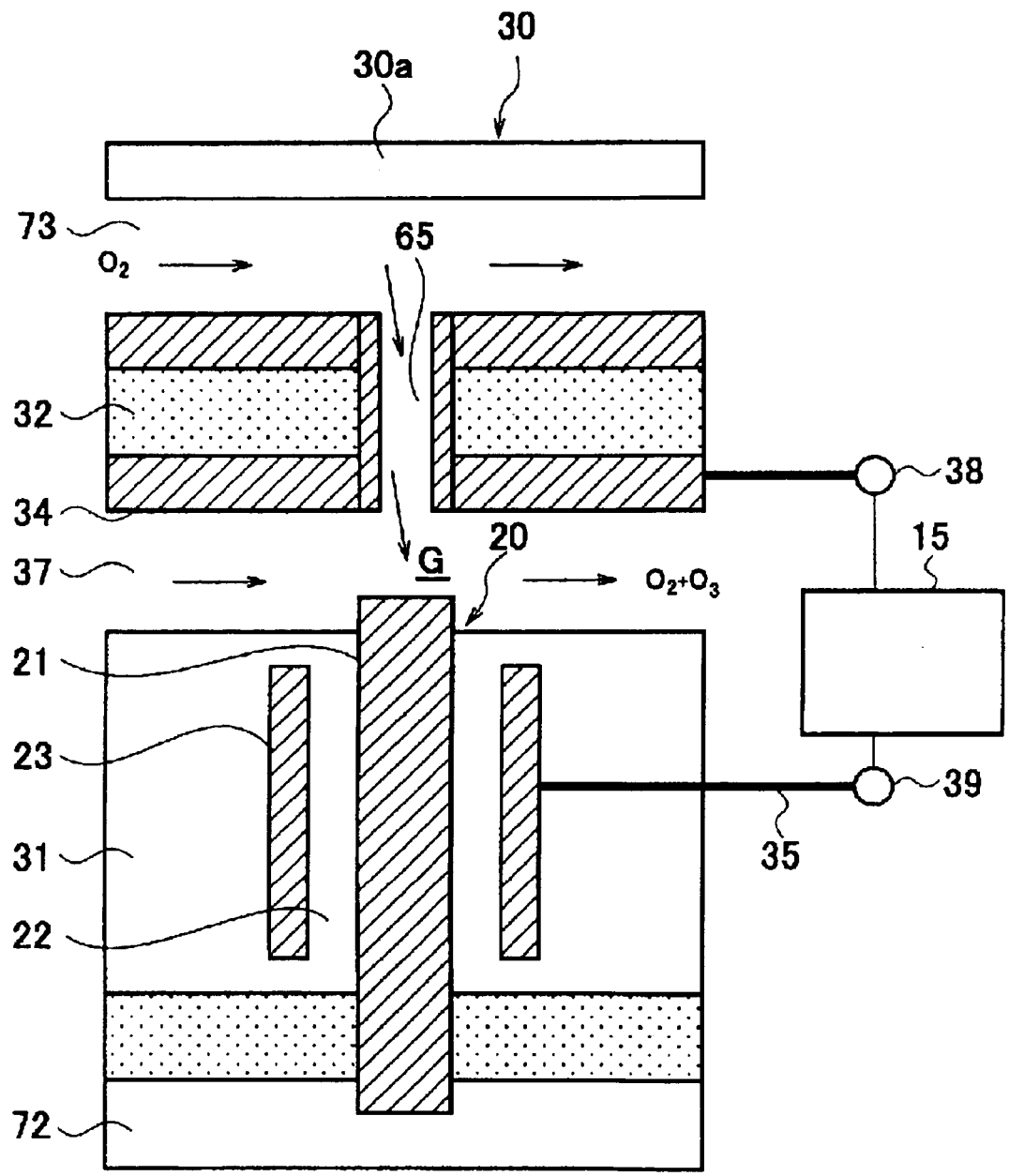
FIG. 12 is an explanatory view showing the gas lead-in method according to the embodiment.

In FIG. 12, the opening hole 65 is provided on the counter part of the counter electrode 34, and the source is supplied to the discharge space 37 through the counter electrode 34.

The basic structure of FIG. 12 is the same as that of FIG. 5, and the different point is that in FIG. 12, as described above, the opening hole 65 is provided for concentrating the charge on the counter electrode 34, and the opening hole 65 serves also as the flow path to lead-in the source gas into the discharge space 37. The refrigerant jacket 32 with counter electrode 34 on the lower surface is provided between an upper wall 30*a* of the container 30 and the insulating block 31 provided with the capacitive coupling electrode 20, for leading-in the source gas into the discharge space 37 from the opening hole 65. Then, an upper space 73 is formed between the refrigerant jacket 32 and the upper wall 30*a*, and the discharge space 37 is formed between the refrigerant jacket 32 and the insulating block 31.

When the source gas is supplied from the side of the counter electrode 34, oxygen $O_2$ as a source gas is led-in the upper space 73, and supplied to the discharge space 37 through the opening hole 65 provided on the counter electrode 34. In the same way as shown in FIG. 11, instead of increasing the number of times the source gas touches on plasma, the ozone $O_3$ thus generated is easily decomposed by a foreign matter and heat.

The structure of FIG. 13 is the same as that of FIG. 12, however the different point is that in FIG. 13, the opening hole 65 is provided on the counter part of the counter electrode 34, so that the gas thus generated is exhausted toward the counter electrode 34. When the gas thus generated is exhausted toward the counter electrode 34, a mixed gas ($O_2$+O) containing ozone $O_3$ as a generated gas is exhausted from the upper space 73 through the opening hole 65. In the same way as shown in FIG. 10, instead of reducing the number of times the source gas touches on plasma, decomposition of the ozone $O_3$ thus generated due to heat and a foreign matter is hard to occur.

Any one of the aforementioned plasma generators is made compact, each structure (design) having an enhanced degree of freedom, and therefore can be easily installed on a dispersion apparatus, a vertical CVD apparatus, a sheet wafer-feed type CVD apparatus, a washing apparatus, an etching (ashing) apparatus and an exhaust gas processing apparatus. Next, an example, to which the aforementioned plasma generator is applied, will be explained.

Figure 14:
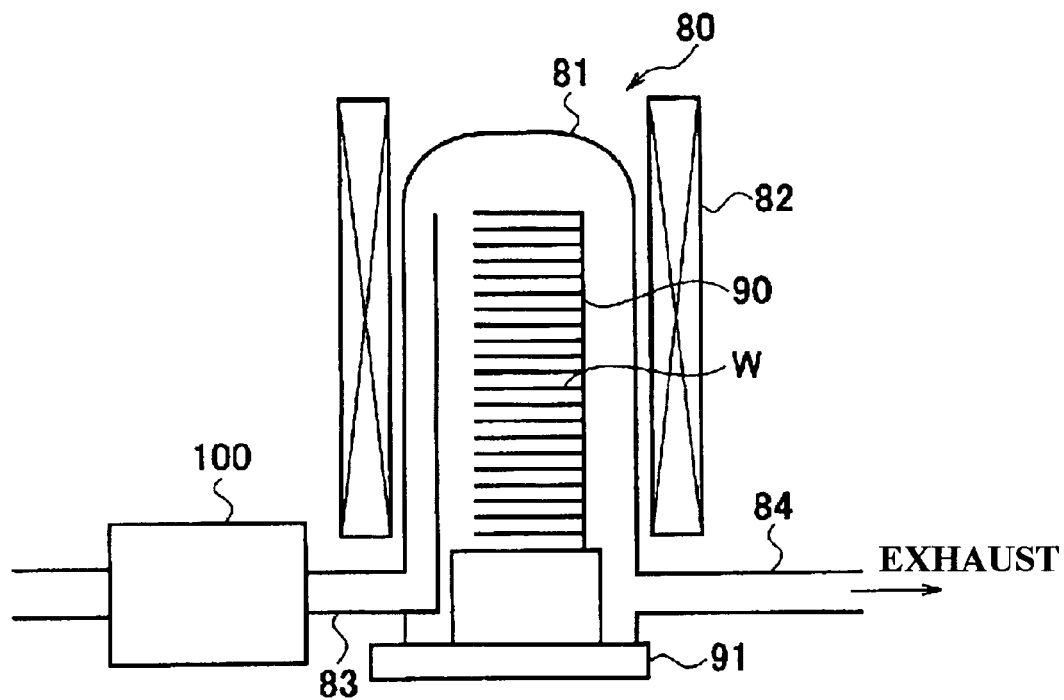
FIG. 14 is a block diagram of a reaction furnace of a vertical dispersion apparatus according to the embodiment.

FIG. 14 shows an example of the structure of a reaction furnace 80 of a vertical dispersion apparatus which functions to oxidize with ozone. The reaction furnace 80 comprises a reacting tube 81 in which a boat 90 having a plurality of substrates W stacked therein is inserted, with an insertion port sealed by a seal cap 91; a heater 82 provided on an outer periphery of the reacting tube 81, for heating the substrate W; a gas supply pipe 83 for supplying gas to the reacting tube 81; and an exhaust pipe 84 for exhausting an atmosphere within the reacting tube 81. An ozone generator 100 of the embodiment is provided in the gas supply pipe 83 communicating to the reacting tube 81.

When ozone $O_2$ is supplied to the ozone generator 100 from the gas supply pipe 83, the oxygen $O_2$ is exposed to plasma, and ozone $O_3$ is thereby generated, and exhausted from the ozone generator 100. The ozone $O_3$ thus exhausted is supplied to the reacting tube 81, to oxidize with ozone a surface of the substrate W heated in the reacting tube 81, and exhausted from the exhaust pipe 84. The substrate W after ozone oxidization is terminated is drawn out of the reacting tube 81 together with the boat 90.

The ozone generator 100 is made compact, and therefore, can be disposed near the reacting tube 81. Ozone $O_3$ is self-decomposed even in the gas supply pipe 83, and changed into oxygen $O_2$. However, when the ozone generator can be disposed near the reacting tube 81, consumption of ozone in the stage of supplying ozone $O_3$ can be reduced as much as possible. In addition, the degree of freedom of the structure of the ozone generator 100 is enhanced, and therefore the ozone generator 100 can be directly installed on the reacting tube 81, in the form of an external combustion apparatus (so-called "external combustion BOX") that generates $H_2O$ gas, for example. In this apparatus, the ozone generator of this embodiment is used, and therefore a plurality of substrates can be effectively oxidized with ozone.

Figure 15:
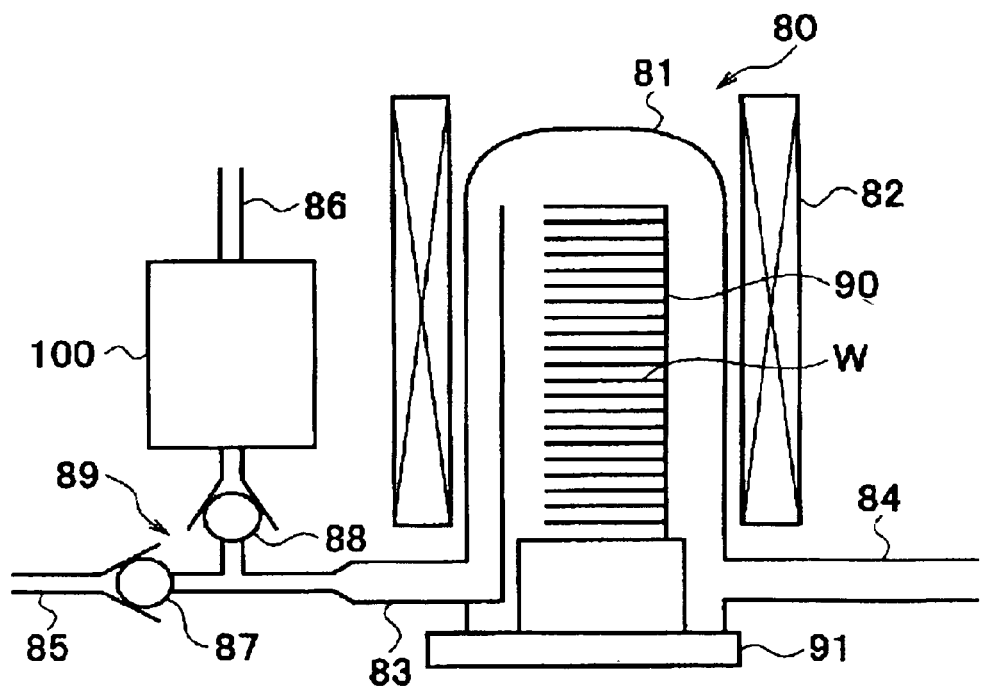
FIG. 15 is a block diagram of the reaction furnace of a CVD apparatus according to the embodiment.

FIG. 15 shows an example of the structure of the reaction furnace 80 of the vertical CVD apparatus. The basic structure of FIG. 15 is the same as that of FIG. 14. The different point is that in FIG. 15, a mixed gas supply system 89 constituted of a source gas supply line 85 and an oxygen supply line 86 is connected to the gas supply pipe 83. The source gas flowing to the source gas supply line 85 is merged with ozone $O_3$ flowing to the oxygen supply line 86, and supplied in the reacting tube 81. Note that the source gas supply line 85 and the oxygen supply line 86 near a merging part are provided with check valves 87 and 88, respectively.

Ozone gas is used as an oxidizing agent of a CVD, and therefore the ozone generator 100 of the embodiment is installed on the oxygen supply line 86. In this case also, as explained in FIG. 14, the ozone generator 100 may be arranged near the reacting tube 81, and may also be installed at the side of a utility which supplies power or the like to the reaction furnace 80, from the viewpoint of maintainability. In this apparatus, the ozone generator of the embodiment is used, and therefore a CVD film can be effectively formed on the plurality of substrates.

This apparatus, which processes the substrate W by using ozone $O_3$, is used for forming a $SiO_2$ film by using TEOS and ozone $O_3$ by means of a CVD method, as a most typical example. Also, other than this example, this apparatus is also used for forming an $Al_2O_3$ film by means of an ALD method to form an atomic layer one by one by, by alternately supplying Al $(CH_3)_3$ and ozone $O_3$. In addition, as an example of processing other than the aforementioned examples, the apparatus is also used when improving (C and H, and so forth are picked up by an oxidation force) a High-K (high dielectric material) film such as a $Ta_2O_5$ film and a $ZrO_2$ film formed on the substrate W and the film such as an $RuO_2$ film used as a material of an electrode, by using ozone.

Figure 16:
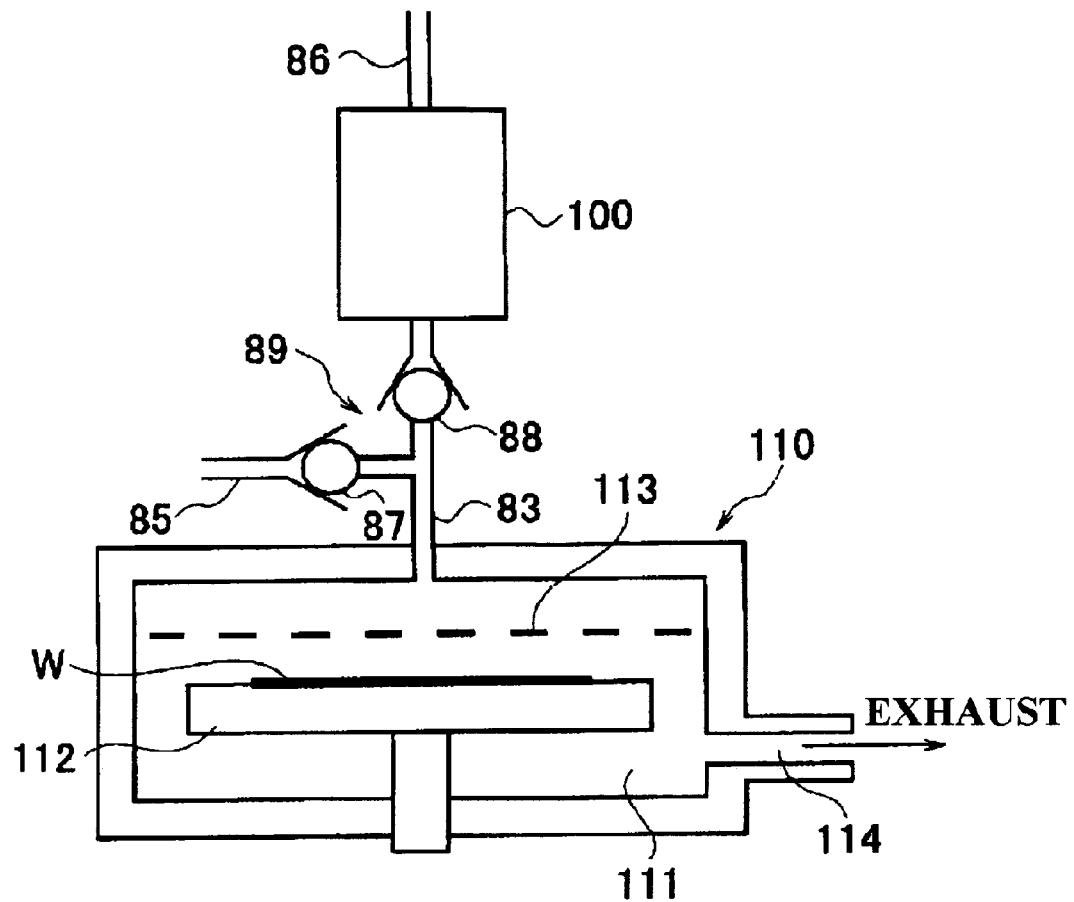
FIG. 16 is a block diagram of the reaction furnace of a sheet wafer-feed type CVD apparatus according to the embodiment.

FIG. 16 shows an example of the structure of the reaction furnace of the sheet wafer-feed type CVD apparatus. The structure of the mixed gas supply system 89 of FIG. 16 is the same as that of FIG. 15, and the different point is that a reaction furnace 110 is not a hot wall batch type but is a cold wall sheet wafer-feed type. In the reaction furnace 110, the substrate W is placed on a susceptor 112 having a heater so as to be heated in a reaction chamber 111 constituting the furnace. Then, the mixed gas led-in from the mixed gas supply system 89 is supplied on the substrate W, and exhausted from the exhaust port 114. In this embodiment, the ozone generator of the embodiment is used, and therefore a CVD film can be effectively formed on a single wafer substrate.

Figure 17:
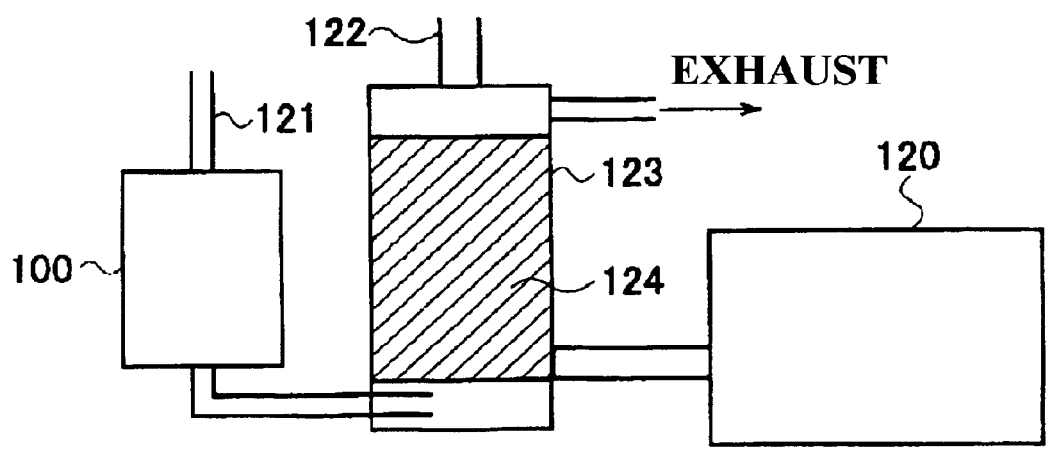
FIG. 17 is a block diagram of a washing apparatus according to the embodiment.

FIG. 17 is an example of the structure of the washing apparatus using ozone. Water led-in a filter 123 from a water supply line 122 is filtered through a filler 124. Meanwhile, ozone $O_3$ is generated by passing oxygen $O_2$ led-in from an oxygen supply line 121 through the ozone generator 100 of the embodiment. By leading-in the ozone $O_3$ in the filter 123, the ozone $O_3$ is dissolved in water filtered by the filler 124, to produce ozone water. Then, the ozone water thus produced is supplied to an object 120 to be washed such as a reacting tube, a reaction chamber, and pipe, to remove a stain. In this embodiment, the ozone generator of the embodiment is used, and therefore washing effects can be enhanced.

Figure 18:
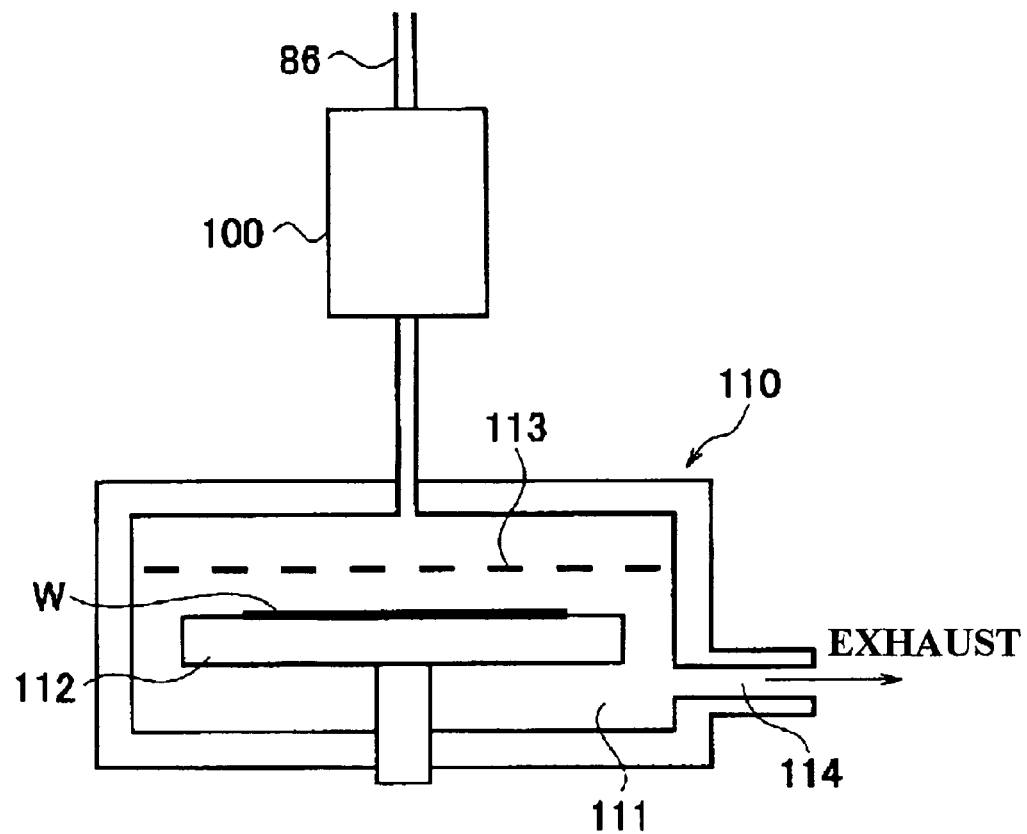
FIG. 18 is a block diagram of a sheet-wafer-feed type etching apparatus according to the embodiment.
Figure 19:
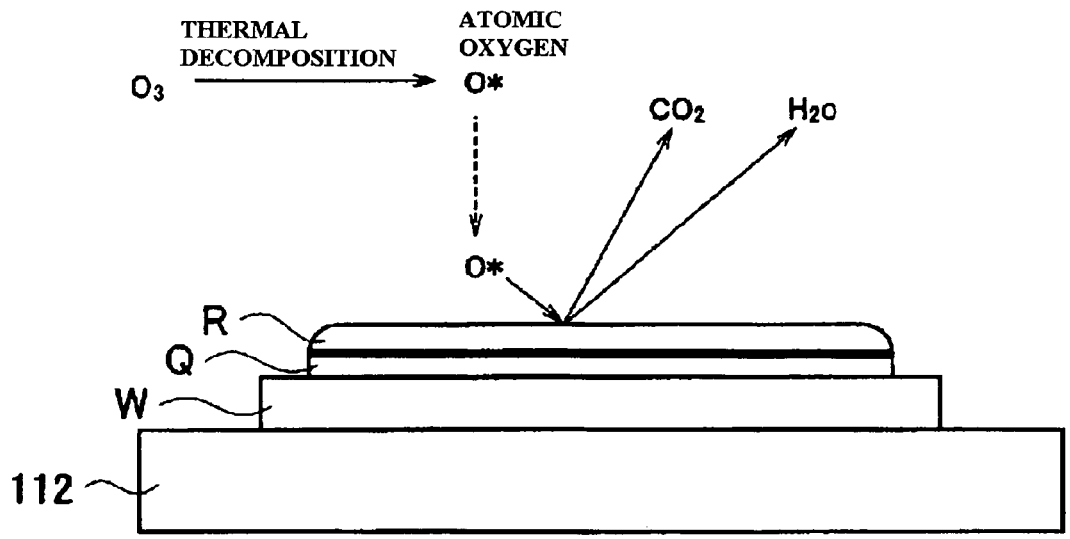
FIG. 19 is an etching (ashing) principle diagram by using ozone according to the embodiment.

FIG. 18 shows an example of the structure of a sheet wafer-feed type etching device. The basic structure of FIG. 18 is the same as that of FIG. 16, and the different point is that the source gas supply line and the check valve are removed and ozone $O_3$ is supplied to the substrate W in the reaction chamber 111 from the ozone generator 100, and the surface of the substrate W is subjected to etching. Ashing can be given as an example of etching. A principle of ashing is shown in FIG. 19. The substrate W is placed on the susceptor 112 having a heater, so as to be heated. A resist film R is formed on the surface of the substrate W through an oxide film Q. The resist film R on the substrate W is removed by using ozone $O_3$. The ozone $O_3$ is decomposed by heat so as to be separated into oxygen $O_2$ and atomic oxygen O.. Since the atomic oxygen O. has a high activity, the resist film R is decomposed into carbon dioxide $CO_2$ and water $H_2O$. In addition, ozone $O_3$ is decomposed into oxygen $O_2$, and therefore the merit is that a specific detoxifying apparatus is not required. In this embodiment, the ozone generator of the embodiment is used, and therefore etching effects can be enhanced.

Figure 20:
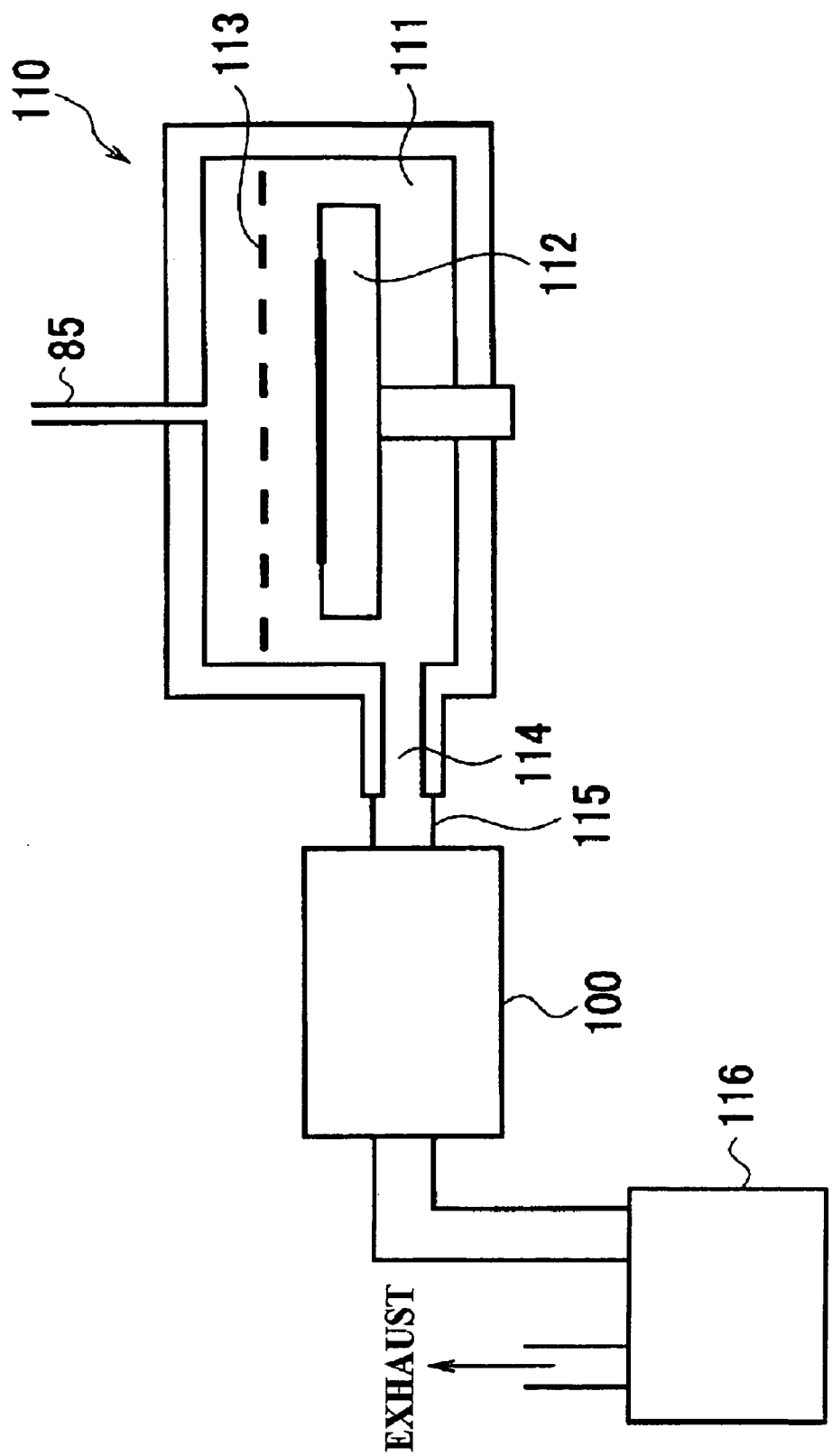
FIG. 20 is a block diagram of an example of the sheet wafer-feed type CVD apparatus provided with an exhaust gas processing apparatus according to the embodiment.
Figure 21:
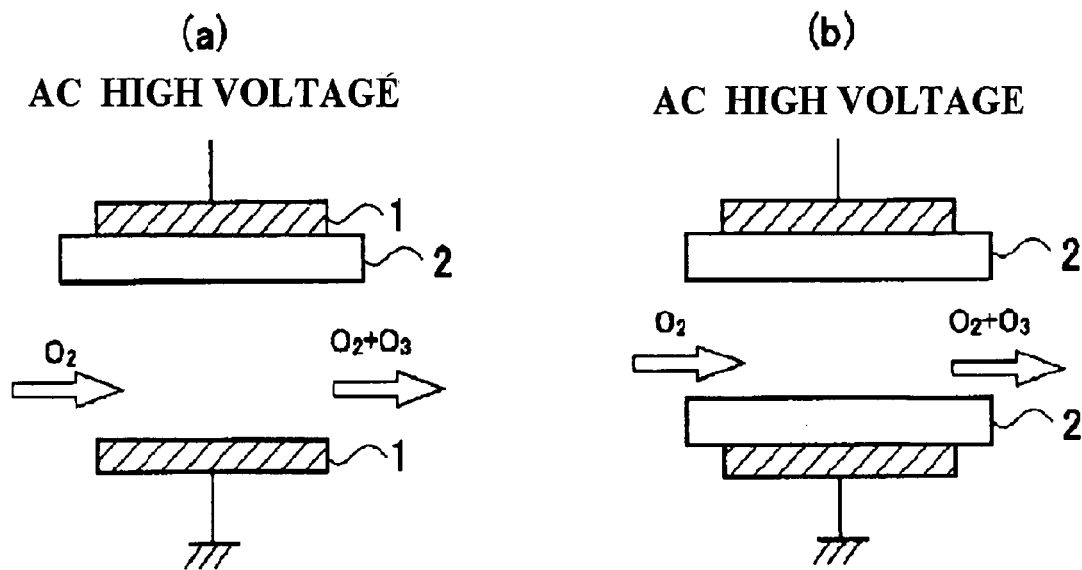
FIG. 21 is a principle diagram of a silent discharge system of a conventional example.
Figure 22:
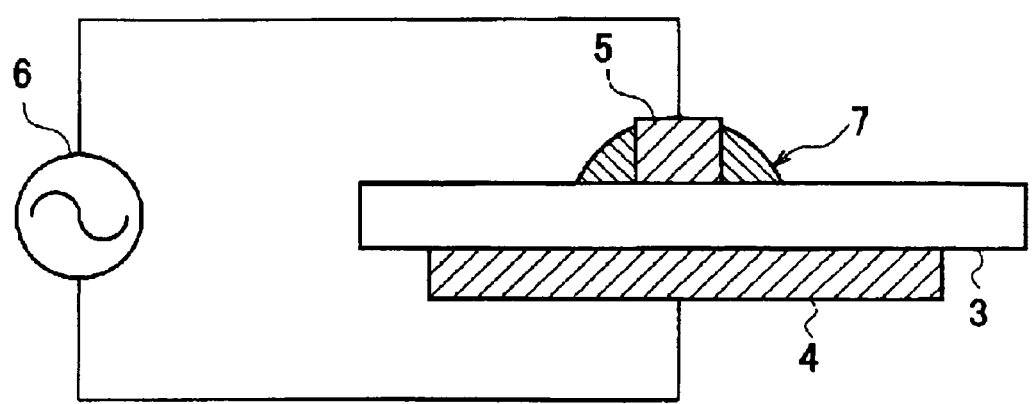
FIG. 22 is a principle diagram of a creeping discharge of the conventional example.

FIG. 20 is a block diagram of the sheet wafer-feed type CVD apparatus provided with an exhaust gas processing apparatus using plasma. TEOS (Tetraethoxysilane) and TRIES (Triethoxysilane) are supplied in the reaction chamber 111 from the source gas supply line 85, and unreacted gas thereof is exhausted from the exhaust port 114. The plasma generator 100 of the embodiment is provided in an exhaust pipe 115 connected to the exhaust port 114. By evacuating the reaction chamber 111 by a pump 116 and passing the unreacted gas through the plasma generator 100, the unreacted gas such as TEOS (Tetraethoxysilane) and the TRIES (Triethoxysilane) is decomposed by plasma, and is exhausted in a safe form, which is Si powder or $SiO_2$ obtained by oxidizing Si powder. This contributes to reducing damage to the pump 116 and a pump life time can be prolonged. In this embodiment, the plasma generator of the embodiment is used, and therefore exhaust gas processing effects can be enhanced.

(Advantage)

According to the embodiments, the dielectric material is not inserted between the electrodes, therefore discharge energy density is increased, and plasma with high efficiency can be generated under the atmospheric pressure. 10 to 1000 times discharge energy density per one discharge can be obtained compared with the silent discharge having the dielectric material interposed between the electrodes. In addition, by connecting the arc-extinguishing capacitor in series to the electrode part, intermittent discharge is induced during arc extinguishment, before being switched to the arc discharge from the glow discharge. Therefore, even if the dielectric material is not inserted in the electrode part, damage to the electrode part can be reduced. Accordingly, contamination generated by sputtering is not generated with little damage to the apparatus.

Also, according to the embodiment, one of the metal electrode is formed by a unitized capacitive coupling electrode, and by using the capacitive coupling electrode thus unitized, the multi-polarized plasma source can be formed, and free degree of design is thereby increased. In addition, by the array of the capacitive coupling electrodes, for example, the plasma source with high efficiency and large area having various shapes as shown in FIG. 4 to FIG. 8 can be formed.

Further, by individually discharging between the common counter electrode and the multi-polarized capacitive coupling electrode, a problem that discharge is hard to be uniformly caused in the space like the parallel plate electrode, is eliminated, and it becomes easy to uniformly cause the discharge even in larger space. Accordingly, the plasma with large area and high density can be easily generated, and ozone generation efficiency can thereby be enhanced. Particularly, when the capacitive coupling electrode is arranged so as to prevent insulation breakdown between the capacitive coupling electrodes, discharge between the capacitive coupling electrodes (discharge in lateral direction) can be prevented. Therefore, the discharge is not deviated, and further uniform plasma can be obtained.

Further, the discharge electrode is set as the metal electrode, and the metal electrode is cooled by the refrigerant. Therefore, heat of the electrode is easily removed, and ozone can be generated at a low temperature. Accordingly, decomposition due to the heat of ozone thus generated can be effectively prevented. The ozone can be generated with efficiency of 1.0 $gO_3$/W·hr by the ozone generator using the system described above. This is a high efficiency of about five times the efficiency 0.22 $gO_3$/W·hr of the conventional silent discharge. A condition of this system at this time is that the discharge gap is set to be 1.0 mm; the capacitive coupling electrode is formed by winding a copper foil around a copper bar ($\phi$ 2 mm) through a silicone thermal contraction tube; and the arc-extinguishing capacitor is set to be 20 pF (at 100 kHz). Also, the number of electrodes are set to be 20, $O_2$ flow rate is set to be 10 slm, and high AC voltage is set to be 50 Hz and 10 $kV_{pp}$.

MODIFIED EXAMPLE

Figure 23:
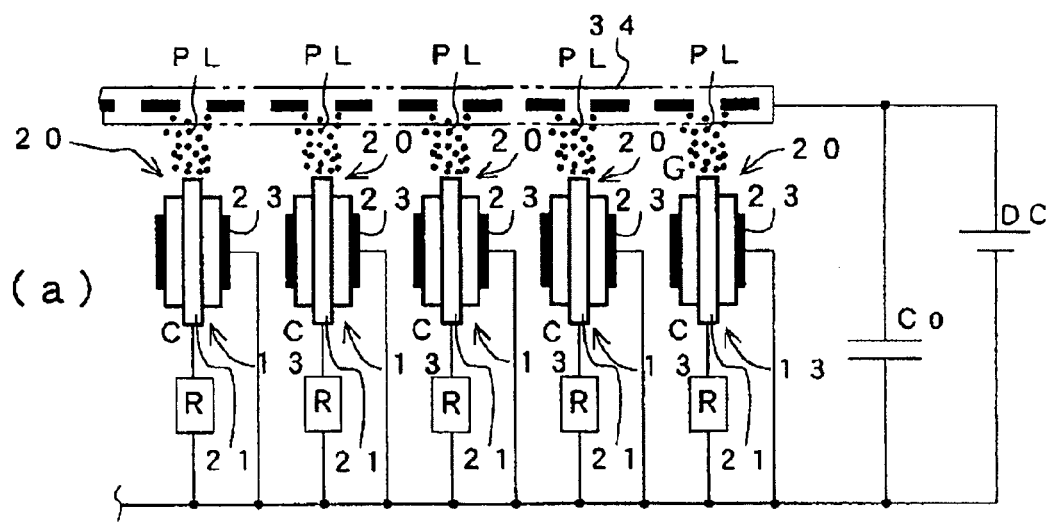
FIG. 23 is a view showing an example of a structure of multi-polarization in which plural capacitive coupling electrodes are arrayed according to a modified example of the embodiment.
Figure 23:
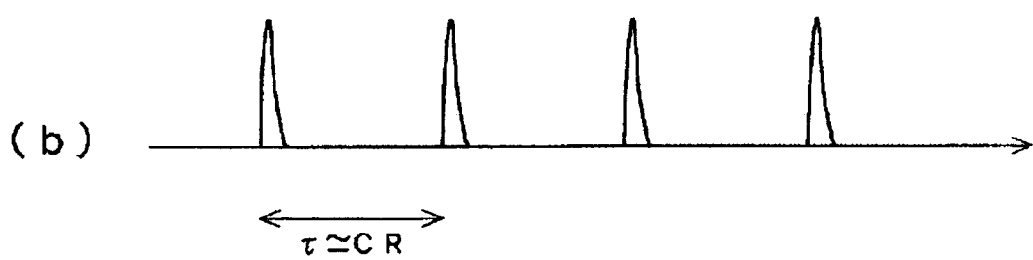
Figure 23:
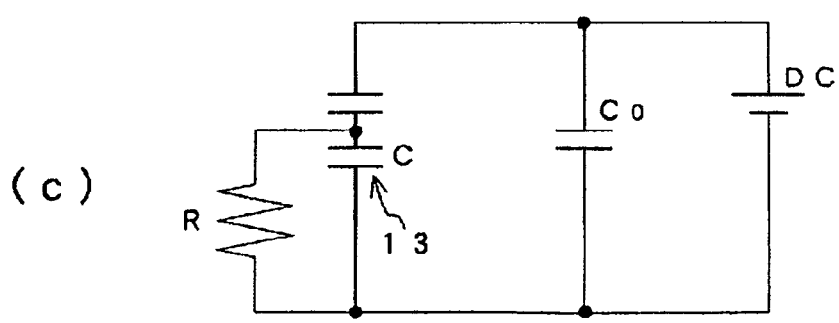

In the aforementioned embodiment, AC voltage is applied between the counter electrode and the capacitive coupling electrode, however DC voltage may be applied therebetween. FIG. 23 shows the modified example, and FIG. 23A is a schematic block diagram of the entire body of the plasma generator, FIG. 23B is a plasma injection power chart of one pole, and FIG. 23C is an equivalent circuit diagram of one pole.

As shown in FIG. 23A, the apparatus is made multi-polarized by arranging plural capacitive coupling electrodes 20 in such a manner that one end of each floating electrode 21 faces the counter electrode 34. Each grounding electrode 23 of the plural capacitive coupling electrodes 20 is grounded, and the other end of each floating electrode 21 is similarly grounded through a resistor R for discharge. The arc-extinguishing capacitor 13 and the resistor R for discharge are thereby connected in parallel, and a discharge circuit is formed, in which the storage charge stored in the arc-extinguishing capacitor C is discharged through the resistor R for discharge (FIG. 23C). A high DC power source is connected between the counter electrode 34 and a ground, to thereby apply DC high voltage. A power-assisting capacitor $C_o$ is connected in parallel to a high DC power source.

When DC high voltage exceeding the discharge starting voltage is applied between the counter electrode 34 and the floating electrode 21 by the high DC power source, inter-electrodes 34 and 21 is virtually short circuited simultaneously with starting discharge, to allow a large current to flow. Therefore, between counter electrode 34 and each capacitive coupling electrode 20 is ignited at random and plasma PL is thereby generated in each discharge gap G. Meanwhile, by this current, the charge starts to be stored in the arc-extinguishing capacitor 13. When the arc-extinguishing capacitor 13 is fully charged, the current stops flowing any more, and the discharge also stops. Specifically, DC pulse discharge is induced, in which the discharge is effected as long as the charge is stored in the arc-extinguishing capacitor 13. The discharge stored in the arc-extinguishing capacitor C is discharged by the resistor R for discharge. By this discharge, the voltage between the electrodes 34 and 21 is increased, and re-ignition is thereby enabled. The period of the ignition of one capacitive coupling electrode 20 is expressed by $\tau \approx CR$ (FIG. 23B). Here, CR refers to a time constant of the discharge of the storage charge.

When the DC power source is used as a power source, potential of the electrode to plasma potential can be fixed, and therefore it is advantageous to be used for a process particularly requiring accelerating/decelerating efficiency of ion species. However, in this case, ½ of injected power is wastefully consumed. That is, a static energy stored in the arc-extinguishing capacitor 13 is converted to Joule heat by the resistor R for discharge.

In this way, in the system of the present invention using the self-arc-extinguishing type capacitive coupling electrode, a DC pulse operation is realized by providing a discharge time constant circuit. This is the characteristic not seen in the silent charge system, and from this point of view, free degree of design is enhanced.

INDUSTRIAL APPLICABILITY

The present invention provides a plasma generator having increased discharge energy density compared with a silent discharge and capable of generating plasma with high efficiency, with a simple structure. In addition, larger discharge energy density contributes to generating ozone with high efficiency. Accordingly, the plasma generator and the ozone generator can be restrained from increasing in volume. Moreover, even when the discharge energy density becomes large, self-arc-extinguishing discharge is induced, and this contributes to reducing damage to the electrode part. In addition, when the electrode is unitized, handling becomes easy.

What is claimed is:

1. A plasma generator comprising:
an electrode part constituted of plural electrodes;
a charge storage part connected with the electrode part in series for storing charge, and
an AC power source for applying AC voltage to a serial connection circuit formed of the electrode part and the charge storage part,
wherein by applying the AC voltage to the serial connection circuit formed of the electrode part and the charge storage part by the AC power source, discharge is intermittently caused in each inter-electrodes of the plural electrodes of the electrode part, and plasma is thereby generated.

2. An ozone generator, comprising:
an electrode part constituted of plural electrodes;
a charge storage part connected with the electrode part in series, for storing charge; and
an AC power source for applying AC voltage to a serial connection circuit formed of the electrode part and the charge storage part,
wherein by applying the AC voltage to the serial connection circuit formed of the electrode part and the charge storage part by the AC power source, discharge is caused intermittently in each inter-electrodes of the plural electrodes of the electrode part, and ozone is generated by supplying gas containing oxygen atom in the discharge atmosphere.

3. A plasma generator, comprising:
an electrode unit constituted of a first electrode, an insulating material or a dielectric material provided around the first electrode, and a second electrode provided around the insulating material or the dielectric material;
a third electrode facing the first electrode; and
a power source for applying voltage between the second electrode and the third electrode,
wherein by the power source, the voltage is applied between the second electrode and the third electrode, discharge is thereby caused between the first electrode and the third electrode, and plasma is thereby generated.

4. The plasma generator according to claim 3, wherein a charge storage part for storing charge is formed by the first electrode and the second electrode, with the insulating material or the dielectric material interposed between the first electrode and-the second electrode.

5. The plasma generator according to claim 3, wherein by applying AC voltage between the second electrode and the third electrode, a pulse discharge is caused between the first electrode and the third electrode, and plasma is thereby intermittently generated.

6. The plasma generator according to claim 3, wherein the plasma is generated in an atmospheric pressure.

7. The plasma generator according to claim 3, wherein the electrode unit is provided in plural numbers.

8. The plasma generator according to claim 3, wherein the electrode unit is provided in plural numbers around the third electrode.

9. The plasma generator according to claim 3, wherein a protrusion portion or a recess portion or an opening hole is provided in a part of the third electrode faced with the first electrode.

10. The plasma generator according to claim 3, wherein the first electrode is formed in a bar-shape.

11. The plasma generator according to claim 3, wherein the first electrode is formed in a cylinder-shape.

12. The plasma generator according to claim 3, wherein the insulating material or the dielectric material, or/and the second electrode are formed in a cylinder shape.

13. The plasma generator according to claim 3, wherein at least the first electrode or/and the third electrode are made of metal.

14. The plasma generator according to claim 3, wherein the first electrode or/and the third electrode are cooled by refrigerant.

15. A substrate processing apparatus, comprising:
an electrode unit constituted of a first electrode, an insulating material or a dielectric material provided around the first electrode, and a second electrode provided around the insulating material or the dielectric material;
a third electrode facing the first electrode; and
a power source for applying voltage between the second electrode and the third electrode,
wherein by the power source, the voltage is applied between the second electrode and the third electrode, discharge is thereby caused between the first electrode and the third electrode, and in this discharge atmosphere, gas containing oxygen atom is supplied, and ozone is thereby generated.

16. A substrate processing apparatus, comprising:
a processing chamber for processing a substrate; and
a plasma generator for generating plasma,
wherein the substrate is processed by using a reactant obtained by exposing a processing gas to the plasma generated by the plasma generator,
the plasma generator comprising:
an electrode unit constituted of a first electrode, an insulating material or a dielectric material provided around the first electrode, and a second electrode provided around the insulating material or the dielectric material;
a third electrode facing the first electrode; and
a power source for applying voltage between the second electrode and the third electrode, wherein by applying the voltage between the second electrode and the third electrode, discharge is caused between the first electrode and the third electrode, and plasma is thereby generated.

17. A substrate processing apparatus, comprising:
a processing chamber for processing a substrate; and
an ozone generator for generating ozone,
wherein by using the ozone generated by the ozone generator, the substrate is processed,
the ozone generator comprising:
an electrode unit constituted of a first electrode, an insulating material or a dielectric material provided around the first electrode, and a second electrode provided around the insulating material or the dielectric material;
a third electrode facing the first electrode; and
a power source for applying voltage between the second electrode and the third electrode,
wherein by applying the voltage between the second electrode and the third electrode, discharge is caused between the first electrode and the third electrode, and in such a discharge atmosphere, gas containing oxygen atom is supplied, and ozone is thereby generated.

18. A method of manufacturing a semiconductor device, with a plasma generator having an electrode unit constituted of a first electrode, an insulating material or a dielectric material provided around the first electrode, and a second electrode provided around the insulating material or the dielectric material, and a third electrode facing the first electrode,
the method comprising the steps of:
generating plasma by causing discharge between the first electrode and the third electrode by applying voltage between the second electrode and the third electrode; and
processing a substrate by using a reactant obtained by exposing a processing gas to the plasma thus generated.

19. The method of manufacturing the semiconductor device according to claim 18, wherein a pulse discharge is caused between the first electrode and the third electrode by applying AC voltage between the second electrode and the third electrode, and plasma is thereby intermittently generated in the plasma generating step.

20. The method of manufacturing the semiconductor device according to claim 18, wherein the substrate is processed in the substrate processing step by using ozone obtained by exposing gas containing oxygen atom to atmosphere where the discharge is caused.

21. A plasma generator, comprising:
an electrode part constituted of plural electrodes;
plural charge storage parts connected in series to the electrode part to store charge; and
an AC power source for applying AC voltage to a circuit in which the plural serial connection parts formed of the electrode part and the plural charge storage parts are connected in parallel,
wherein by applying the AC voltage by this AC power source to the circuit in which the serial connection part formed of the electrode part and the plural charge storage parts are connected in parallel, discharge is intermittently caused between plural electrodes of the electrode part, and plasma is thereby generated.

* * * * *